(12) United States Patent
Drummond et al.

(10) Patent No.: US 11,954,909 B2
(45) Date of Patent: Apr. 9, 2024

(54) SEMANTIC LABELING OF NEGATIVE SPACES

(71) Applicant: Apple Inc., Cupertino, CA (US)

(72) Inventors: Mark Drummond, Palo Alto, CA (US); Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/209,582

(22) Filed: Jun. 14, 2023

(65) Prior Publication Data

US 2023/0326205 A1 Oct. 12, 2023

Related U.S. Application Data

(63) Continuation of application No. 17/222,577, filed on Apr. 5, 2021, now Pat. No. 11,715,299.

(60) Provisional application No. 63/031,927, filed on May 29, 2020.

(51) Int. Cl.
*G06V 20/20* (2022.01)
*G06T 19/00* (2011.01)

(52) U.S. Cl.
CPC .......... *G06V 20/20* (2022.01); *G06T 19/006* (2013.01)

(58) Field of Classification Search
CPC ............................. G06V 20/20; G06T 19/006
USPC ....................................................... 382/181
See application file for complete search history.

(56) References Cited

U.S. PATENT DOCUMENTS

| 10,650,278 | B1 | 5/2020 | Ho et al. |
| 10,824,923 | B1 | 11/2020 | Forster |
| 11,715,299 | B1* | 8/2023 | Drummond ............ G06V 20/64 382/181 |
| 2015/0138310 | A1 | 5/2015 | Fan et al. |
| 2017/0193706 | A1 | 7/2017 | Lo et al. |
| 2017/0206465 | A1* | 7/2017 | Jin ...................... G06F 16/5866 |
| 2019/0043203 | A1 | 2/2019 | Fleishman et al. |
| 2020/0342674 | A1 | 10/2020 | Chen et al. |
| 2021/0272355 | A1 | 9/2021 | Jotwani |
| 2021/0303638 | A1* | 9/2021 | Zhong ................... G06F 40/169 |
| 2022/0121822 | A1* | 4/2022 | Zhou ..................... G06F 40/295 |

* cited by examiner

*Primary Examiner* — Gabriel I Garcia
(74) *Attorney, Agent, or Firm* — Fernando & Partners, LLP

(57) ABSTRACT

In one implementation, a method of defining a negative space in a three-dimensional scene model is performed at a device including a processor and non-transitory memory. The method includes obtaining a three-dimensional scene model of a physical environment including a plurality of points, wherein each of the plurality of points is associated with a set of coordinates in a three-dimensional space. The method includes defining a subspace in the three-dimensional space with less than a threshold number of the plurality of points. The method includes determining a semantic label for the subspace. The method includes generating a characterization vector of the subspace, wherein the characterization vector includes the spatial extent of the subspace and the semantic label.

21 Claims, 15 Drawing Sheets

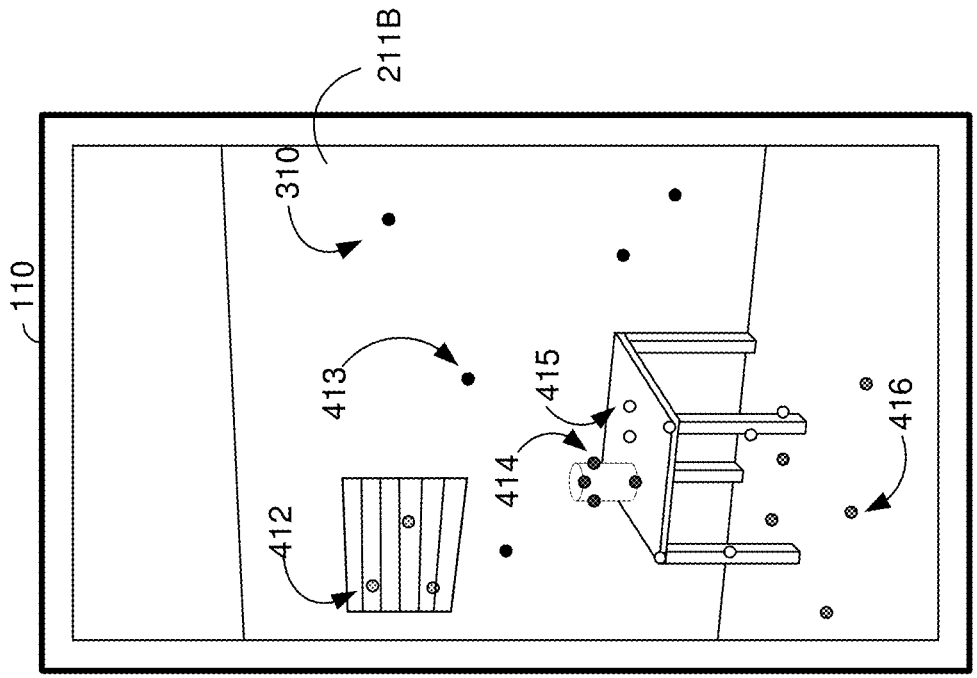
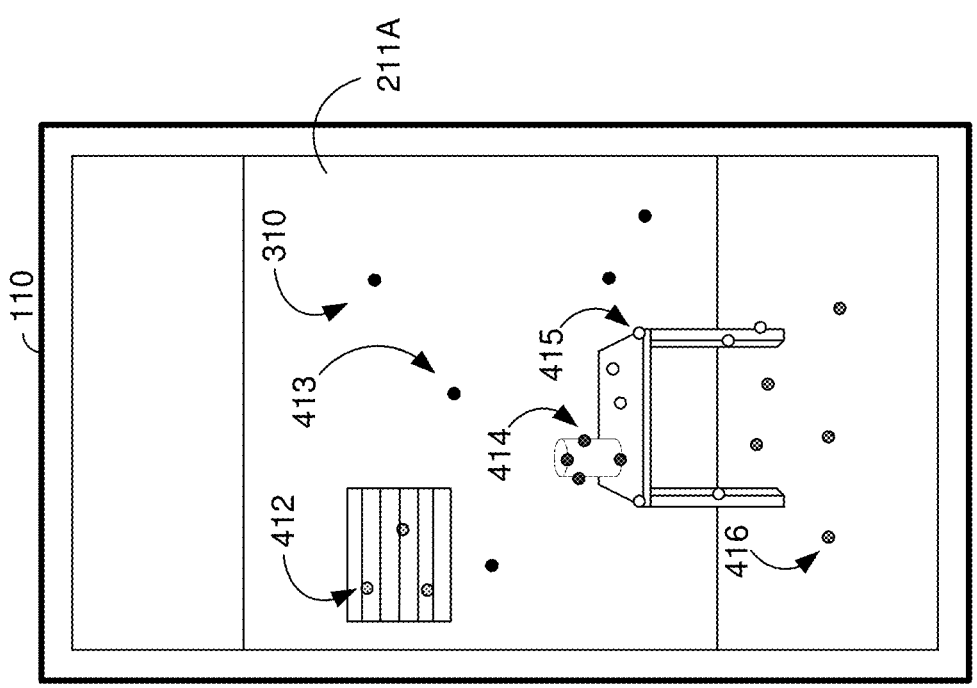
Figure 4B
Figure 4A

| 510 | 520 | 530 | 540 | 550 |
|---|---|---|---|---|
| 1 | (X1, Y1, Z1) | A / a | "bulk" - "table" - "wood" / "flat" - "horizontal" - "tabletop" - "wood" | SRV(A) / SRV(A,a) |
| 2 | (X2, Y2, Z2) | A / a | "bulk" - "table" - "wood" / "flat" - "horizontal" - "tabletop" - "wood" | SRV(A) / SRV(A,a) |
| 3 | (X3, Y3, Z3) | A / a | "bulk" - "table" - "wood" / "flat" - "horizontal" - "tabletop" - "wood" | SRV(A) / SRV(A,a) |
| 4 | (X4, Y4, Z4) | B | "flat" - "horizontal" - "floor" - "carpet" | SRV(B) |
| 5 | (X5, Y5, Z5) | B | "flat" - "horizontal" - "floor" - "carpet" | SRV(B) |
| 6 | (X6, Y6, Z6) | A / b | "bulk" - "table" - "wood" / "rod" - "vertical" - "leg" - "wood" | SRV(A) / SRV(A,b) |
| 7 | (X7, Y7, Z7) | C | "bulk" - "cylinder" - "soda can" | SRV(C) |
| 8 | (X8, Y8, Z8) | C | "bulk" - "cylinder" - "soda can" | SRV(C) |
| 9 | (X9, Y9, Z9) | B | "flat" - "horizontal" - "floor" - "carpet" | SRV(B) |
| 10 | (X10, Y10, Z10) | D | "flat" - "vertical" - "wall" - "painted" | SRV(D) |
| 11 | (X11, Y11, Z11) | E | "flat" - "vertical" - "picture" - "face" | SRV(E) |
| 12 | (X12, Y12, Z12) | D | "flat" - "vertical" - "wall" - "painted" | SRV(D) |

At a device including a processor and non-transitory memory: —1110

Obtaining a three-dimensional scene model of a physical environment including a plurality of points, wherein each of the plurality of points is associated with a set of coordinates in a three-dimensional space Defining a subspace in the three-dimensional space with less than a threshold number of the plurality of points —1120

Determining a semantic label for the subspace —1130

Generating a characterization vector of the subspace, wherein the characterization vector includes the spatial extent of the subspace and the semantic label —1140

Figure 11

SEMANTIC LABELING OF NEGATIVE SPACES

CROSS-REFERENCES TO RELATED APPLICATIONS

This application is a continuation of U.S. patent application Ser. No. 17/222,577, filed on Apr. 5, 2021, which claims priority to U.S. Provisional Patent App. No. 63/031,927, filed on May 29, 2020, which are both hereby incorporated by reference in their entirety.

TECHNICAL FIELD

The present disclosure generally relates to three-dimensional scene models and, in particular, to systems, methods, and devices for generating and using three-dimensional scene models with semantically labeled negative spaces.

BACKGROUND

A point cloud includes a set of points in a three-dimensional space. In various implementations, each point in the point cloud corresponds to a surface of an object in a physical environment. Point clouds can be used to represent a physical environment in various computer vision and/or extended reality (XR) applications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A and 4B illustrate the handheld electronic device of FIG. 1 displaying the two images overlaid with a representation of the point cloud spatially disambiguated into a plurality of clusters.

FIG. 5 illustrates a point cloud data object in accordance with some implementations.

FIG. 11 is a flowchart representation of a method of defining a negative space in a three-dimensional scene model in accordance with some implementations.

Figure 1:
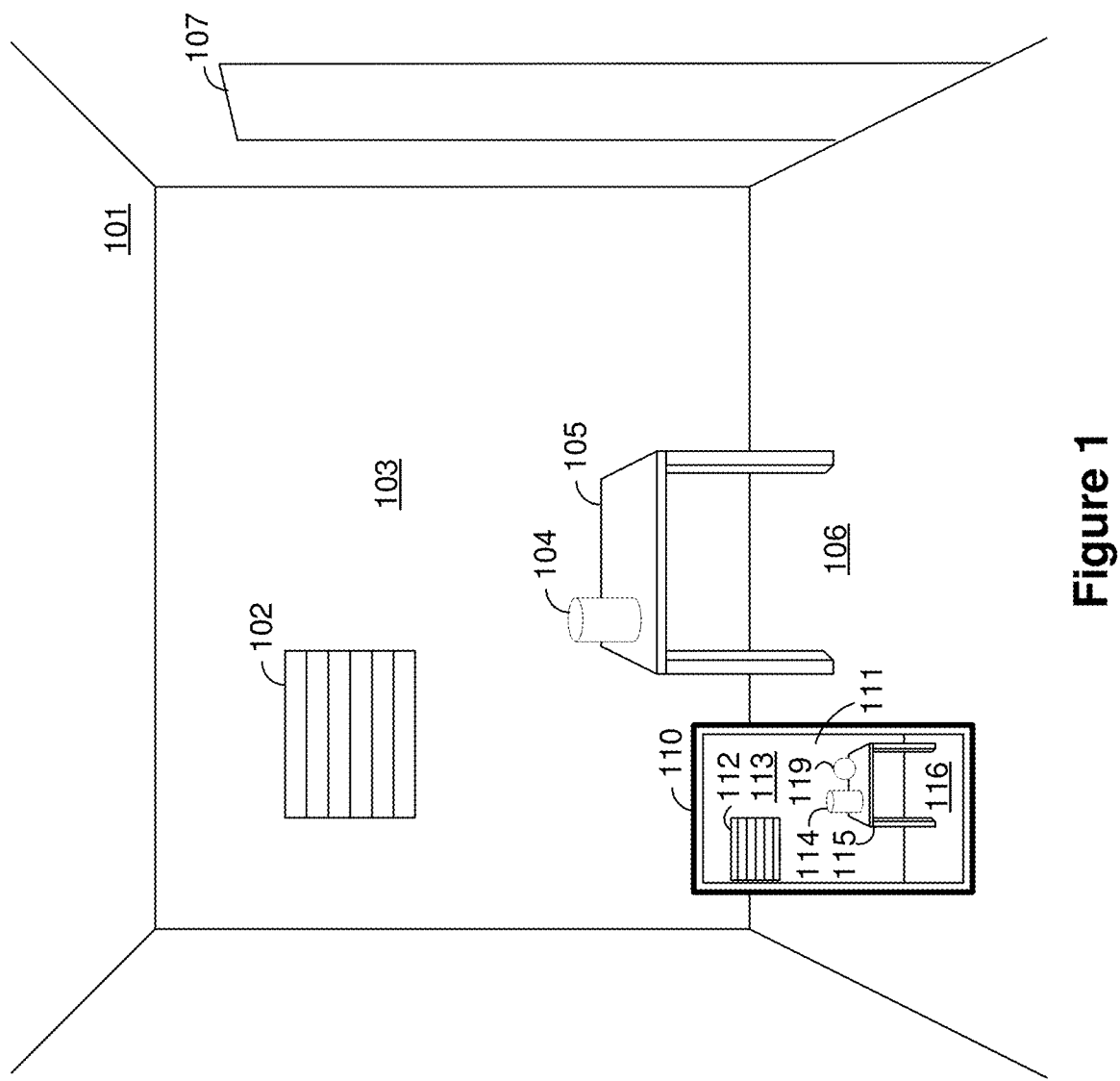
FIG. 1 illustrates a physical environment with a handheld electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for defining a negative space in a three-dimensional scene model. In various implementations, a method is performed at a device including a processor and non-transitory memory. The method includes obtaining a three-dimensional scene model of a physical environment including a plurality of points, wherein each of the plurality of points is associated with a set of coordinates in a three-dimensional space. The method includes defining a subspace in the three-dimensional space with less than a threshold number of the plurality of points. The method includes determining a semantic label for the subspace. The method includes generating a characterization vector of the subspace, wherein the characterization vector includes the spatial extent of the subspace and the semantic label.

Various implementations disclosed herein include devices, systems, and methods for displaying a representation of an objective-effectuator. In various implementations, a method is performed at a device including a display, a processor, and non-transitory memory. The method includes obtaining a three-dimensional scene model of a physical environment including a plurality of points, wherein each of the plurality of points is associated with a set of coordinates in a three-dimensional space, wherein the three-dimensional scene model includes a characterization vector of a subspace including the spatial extent of the subspace and a semantic label. The method includes displaying, on the display, a representation of an objective-effectuator at a first location in the three-dimensional space. The method includes determining, based on the semantic label, a path for the objective-effectuator from the first location to a second location in the three-dimensional space. The method includes displaying, on the display, the representation of the objective-effectuator moving along the path from the first location to the second location.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a physical environment is represented by a point cloud. The point cloud includes a plurality of points, each of the plurality of points associated with at least a set of coordinates in the three-dimensional space and corresponding to a surface of an object in the physical environment. In various implementations, each of the plurality of points is further associated with other data representative of the surface of the object in the physical environment, such as RGB data representative of the color of the surface of the object. In various implementations, at least one of the plurality of points is further associated with a semantic label that represents an object type or identity of the surface of the object. For example, the semantic label may be "tabletop" or "table" or "wall". In various implementations, at least one of the plurality of points is further associated with a spatial relationship vector that characterizes the spatial relationship between a cluster including the point and one or more other clusters of points.

In various implementations, a three-dimensional scene model of a physical environment includes the point cloud. For example, in various implementations, a three-dimensional scene model of a physical environment includes a point cloud as vertices of one or more mesh-based object models, wherein the one or more mesh-based object models include one or more edges between the vertices. In various implementations, the mesh-based object models further include one or more faces surrounded by edges, one or more textures associated with the faces, and/or a semantic label, object/cluster identifier, physics data or other information associated with the mesh-based object model.

In various implementations, in addition to points respectively associated with semantic labels, the three-dimensional scene model further includes negative spaces (e.g., subspaces of the physical environment with less than a threshold number of points) respectively associated with semantic labels. In various implementations, objective-effectuators perform actions based on the semantic labels of the negative spaces.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with a handheld electronic device 110 surveying the physical environment 101. The physical environment 101 includes a vent 102 in a wall 103, a table 105 on a floor 106, a cylinder 104 on the table 105, and a doorway 107.

The handheld electronic device 110 displays, on a display, a representation of the physical environment 111 including a representation of the vent 112 in a representation of the wall 113, a representation of the table 115 on a representation of the floor 116, a representation of the cylinder 114 on the representation of the table 115. In various implementations, the representation of the physical environment 111 is generated based on an image of the physical environment captured with a scene camera of the handheld electronic device 110 having a field-of-view directed toward the physical environment 101. In FIG. 1, because the doorway 107 is not within the field-of-view of the scene camera, the representation of the physical environment 111 does not include a representation of the doorway.

In addition to the representations of real objects of the physical environment 101, the representation of the physical environment 111 includes a virtual object 119 displayed on the representation of the table 115.

In various implementations, the handheld electronic device 110 includes a single scene camera (or single rear-facing camera disposed on an opposite side of the handheld electronic device 110 as the display). In various implementations, the handheld electronic device 110 includes at least two scene cameras (or at least two rear-facing cameras disposed on an opposite side of the handheld electronic device 110 as the display).

Figure 2B:
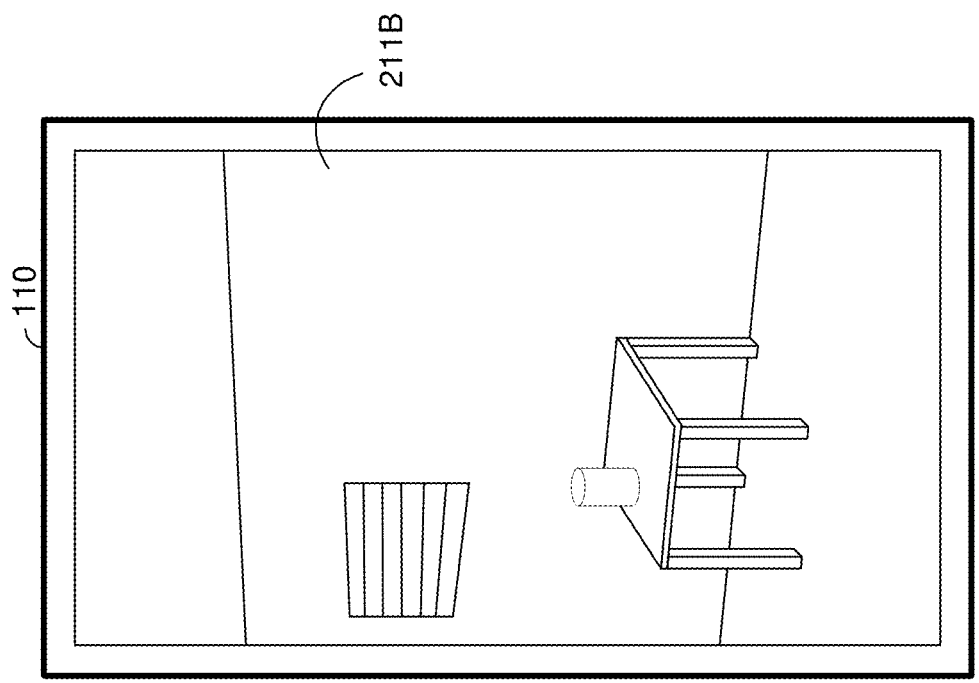
FIGS. 2A and 2B illustrate the handheld electronic device of FIG. 1 displaying two images of the physical environment captured from different perspectives.
Figure 2A:
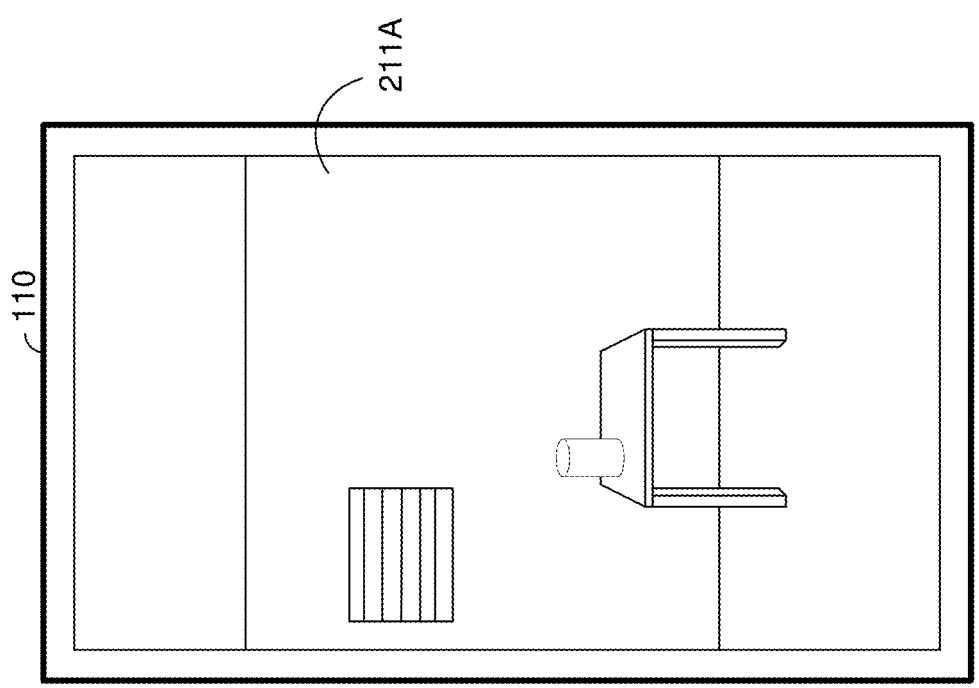

FIG. 2A illustrates the handheld electronic device 110 displaying a first image 211A of the physical environment 101 captured from a first perspective. FIG. 2B illustrates the handheld electronic device 110 displaying a second image 211B of the physical environment 101 captured from a second perspective different from the first perspective.

In various implementations, the first image 211A and the second image 211B are captured by the same camera at different times (e.g., by the same single scene camera at two different times when the handheld electronic device 110 is moved between the two different times). In various implementations, the first image 211A and the second image 211B are captured by different cameras at the same time (e.g., by two scene cameras).

Using a plurality of images of the physical environment 101 captured from a plurality of different perspectives, such as the first image 211A and the second image 211B, the handheld electronic device 110 generates a point cloud of the physical environment 101.

Figure 3B:
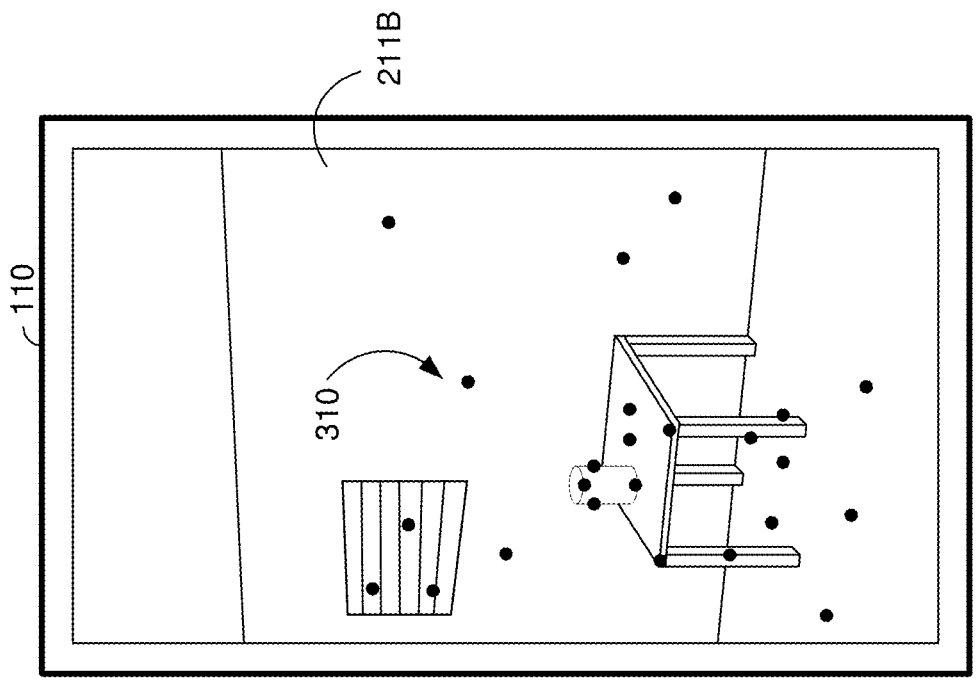
FIGS. 3A and 3B illustrate the handheld electronic device of FIG. 1 displaying the two images overlaid with a representation of a point cloud.
Figure 3A:
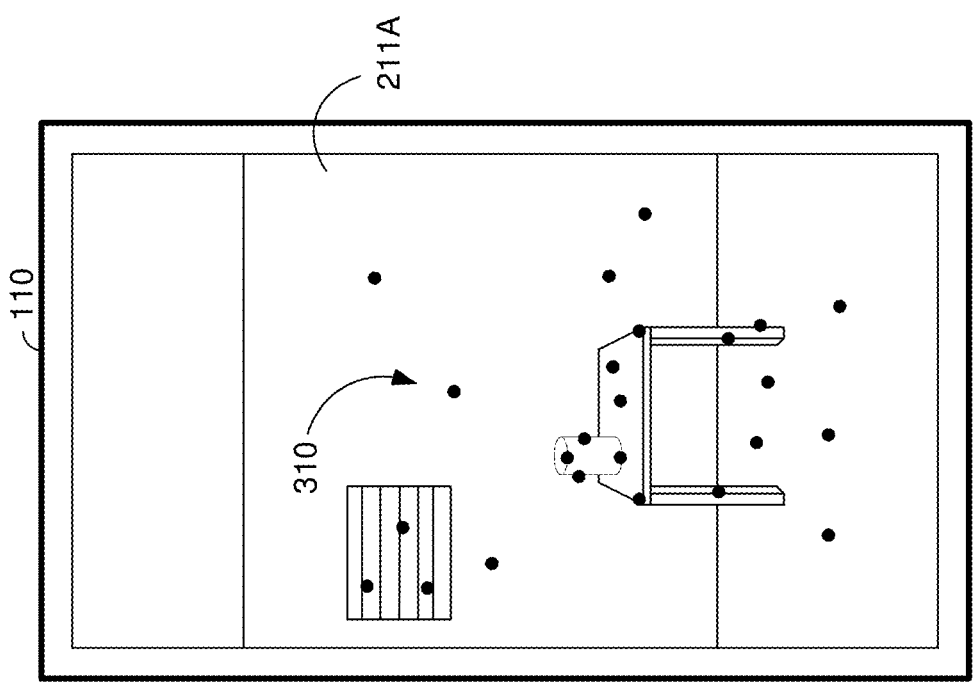

FIG. 3A illustrates the handheld electronic device 110 displaying the first image 211A overlaid with a representation of the point cloud 310. FIG. 3B illustrates the handheld electronic device 110 displaying the second image 211B overlaid with the representation of the point cloud 310.

The point cloud includes a plurality of points, wherein each of the plurality of points is associated with a set of coordinates in a three-dimensional space. For example, in various implementations, each point is associated with an x-coordinate, a y-coordinate, and a z-coordinate. In various implementations, each point in the point cloud corresponds to a feature in the physical environment 101, such as a surface of an object in the physical environment 101.

The handheld electronic device 110 spatially disambiguates the point cloud into a plurality of clusters. Accordingly, each of the clusters includes a subset of the points of the point cloud.

FIG. 4A illustrates the handheld electronic device 110 displaying the first image 211A overlaid with the representation of the point cloud 310 spatially disambiguated into a plurality of clusters 412-416. FIG. 4B illustrates the handheld electronic device 110 displaying the second image 211B overlaid with the representation of the point cloud 310 spatially disambiguated into the plurality of clusters 412-416. The representation of the point cloud 310 includes a first cluster 412 (shown in light gray), a second cluster 413 (shown in black), a third cluster 414 (shown in dark gray), a fourth cluster 415 (shown in white), and a fifth cluster 416 (shown in medium gray).

In various implementations, each of the plurality of clusters is assigned a unique cluster identifier. For example, the clusters may be assigned numbers, letters, or other unique labels.

In various implementations, for each cluster, the handheld electronic device 110 determines a semantic label. In various implementations, each cluster corresponds to an object in the physical environment. For example, in FIG. 4A and FIG. 4B, the first cluster 412 corresponds to the vent 102, the second cluster 413 corresponds to the wall 103, the third cluster 414 corresponds to the cylinder 104, the fourth cluster 415 corresponds to the table 105, and the fifth cluster 416 corresponds to the floor 106. In various implementations, the semantic label indicates an object type or identity of the object. In various implementations, the handheld electronic device 110 stores the semantic label in association with each point of the cluster.

In various implementations, the handheld electronic device 110 determines multiple semantic labels for a cluster. In various implementations, the handheld electronic device 110 determines a series of hierarchical or layered semantic labels for the cluster. For example, the handheld electronic device 110 determines a number of semantic labels that identifies the object represented by the cluster with increasing degrees of specificity. For example, the handheld electronic device 110 determines a first semantic label of "flat" for the cluster indicating that the cluster has one dimension substantially smaller than the other two. The handheld electronic device 110 then determines a second semantic label of "horizontal" indicating that the flat cluster is horizontal, e.g., like a floor or tabletop rather than vertical like a wall or picture. The handheld electronic device 110 then determines a third semantic label of "floor" indicating that that the flat, horizontal cluster is a floor rather than a table or ceiling. The handheld electronic device 110 then determines a fourth semantic label of "carpet" indicating that the floor is carpeted rather than a tile or hardwood floor.

In various implementations, the handheld electronic device 110 determines sub-labels associated with sub-clusters of a cluster. In various implementations, the handheld electronic device 110 spatially disambiguates portions of the cluster into a plurality of sub-clusters and determining a semantic sub-label based on the volumetric arrangement of the points of a particular sub-cluster of the cluster. For example, in various implementations, the handheld electronic device 110 determines a first semantic label of "table" for the cluster. After spatially disambiguating the table cluster into a plurality of sub-clusters, a first semantic sub-label of "tabletop" is determined for a first sub-cluster, whereas a second semantic sub-label of "leg" is determined for a second sub-cluster.

The handheld electronic device 110 can use the semantic labels in a variety of ways. For example, in various implementations, the handheld electronic device 110 can display a virtual object, such as a virtual ball, on the top of a cluster labeled as a "table", but not on the top of a cluster labeled as a "floor". In various implementations, the handheld electronic device 110 can display a virtual object, such as a virtual painting, over a cluster labeled as a "picture", but not over a cluster labeled as a "television".

In various implementations, the handheld electronic device 110 determines spatial relationships between the various clusters. For example, in various implementations, the handheld electronic device 110 determines a distance between the first cluster 412 and the fifth cluster 416. As another example, in various implementations, the handheld electronic device 110 determines a bearing angle between the first cluster 412 and the fourth cluster 415. In various implementations, the handheld electronic device 110 stores the spatial relationships between a particular first cluster and the other first clusters as a spatial relationship vector in association with each point of the particular first cluster.

The handheld electronic device 110 can use the spatial relationship vectors in a variety of ways. For example, in various implementations, the handheld electronic device 110 can determine that objects are the physical environment are moving based on changes in the spatial relationship vectors. As another example, in various implementations, the handheld electronic device 110 can determine that a light emitting object is at a particular angle to another object and project light onto the other object from the particular angle. As another example, the handheld electronic device 110 can determine that an object is in contact with another object and simulate physics based on that contact.

In various implementations, the handheld electronic device 110 stores information regarding the point cloud as a point cloud data object.

FIG. 5 illustrates a point cloud data object 500 in accordance with some implementations. The point cloud data object 500 includes a plurality of data elements (shown as rows in FIG. 5), wherein each data element is associated with a particular point of a point cloud. The data element for a particular point includes a point identifier field 510 that includes a point identifier of a particular point. As an example, the point identifier may be a unique number. The data element for the particular point includes a coordinate field 520 that includes a set of coordinates in a three-dimensional space of the particular point.

The data element for the particular point includes a cluster identifier field 530 that includes an identifier of the cluster into which the particular point is spatially disambiguated. As an example, the cluster identifier may be a letter or number. In various implementations, the cluster identifier field 530 also includes an identifier of a sub-cluster into which the particular point is spatially disambiguated.

The data element for the particular point includes a semantic label field 540 that includes one or more semantic labels for the cluster into which the particular point is spatially disambiguated. In various implementations, the semantic label field 540 also includes one or more semantic labels for the sub-cluster into which the particular point is spatially disambiguated.

The data element for the particular point includes a spatial relationship vector field 550 that includes a spatial relationship vector for the cluster into which the particular point is spatially disambiguated. In various implementations, the spatial relationship vector field 540 also includes a spatial relationship vector for the sub-cluster into which the particular point is spatially disambiguated.

The semantic labels and spatial relationships may be stored in association with the point cloud in other ways. For example, the point cloud may be stored as a set of cluster objects, each cluster object including a cluster identifier for a particular cluster, a semantic label of the particular cluster, a spatial relationship vector for the particular cluster, and a plurality of sets of coordinates corresponding to the plurality of points spatially disambiguated into the particular cluster.

In FIG. 5, a first point of the point cloud is assigned a point identifier of "1" (and may be referred to as "point 1"). Point 1 is associated with a first a set of coordinates in a three-dimensional space of (X1, Y1, Z1). Point 1 is spatially disambiguated into a cluster associated with a cluster identifier of "A" (which may be referred to as "cluster A") and a sub-cluster associated with a sub-cluster identifier of "a" (which may be referred to as "sub-cluster A,a"). Point 1 is associated with a set of semantic labels for cluster A and is further associated with a set of semantic labels for associated with sub-cluster A,a. Point 1 is associated with a spatial relationship vector of cluster A (SRV(A)) and a spatial relationship vector of sub-cluster A,a (SRV(A,a)). Points 2-12 are similarly associated with respective data.

Cluster A (and accordingly, point 1) is associated with a semantic label of "bulk" that indicates a shape of cluster A. In various implementations, each cluster is associated with a semantic label that indicates the shape of the cluster. In various implementations, each cluster is associated with a semantic label of "flat" indicating that the cluster has one dimension substantially smaller than the other two, "rod" indicating that the cluster has one dimension substantially larger than the other two, or "bulk" indicating that no dimension of the cluster is substantially larger than the others.

In various implementations, a cluster associated with a semantic label of "flat" or "rod" includes a semantic label indicating an orientation of the cluster (e.g., which dimension is substantially smaller or larger than the other two). For example, point 9 is associated with a semantic label of "flat" and a semantic label of "horizontal" indicating that the height dimension is smaller than the other two. As another example, point 10 is associated with a semantic label of "flat" and a semantic label of "vertical" indicating that the height dimension is not the smaller dimension. As another example, point 6 is associated with a semantic label of "rod" and a semantic label of "vertical" indicating that the height dimension is larger than the other two.

Cluster A is associated with a semantic label of "table" that indicates an object identity of cluster A. In various implementations, one or more clusters are respectively associated with one or more semantic labels that indicates an object identity of the cluster. For example, point 1 is associated with a semantic label of "table", point 9 is associated with a semantic label of "floor", and point 11 is associated with a semantic label of "picture".

Cluster A is associated with a semantic label of "wood" that indicates an object property of the object type. In various implementations, one or more clusters are respectively associated with one or more semantic labels that indicates an object property of the object type of the cluster. In various implementations, a cluster associated with a semantic label indicating a particular object type also includes one or more of a set of semantic labels associated with the particular object type. For example, a cluster associated with a semantic label of "table" may include a semantic label of "wood", "plastic", "conference table", "nightstand", etc. As another example, a cluster associated with a semantic label of "floor" may include a semantic label of "carpet", "tile", "hardwood", etc.

In various implementations, a cluster associated with a semantic label indicating a particular object property also includes one or more of a set of semantic labels associated with the particular object property that indicates a detail of the object property. For example, a cluster associated with a semantic label of "table" and a semantic label of "wood" may include a semantic label of "oak", "mahogany", "maple", etc.

Sub-cluster A,a (and, accordingly, point 1) is associated with a set of semantic labels including "flat", "horizontal", "tabletop", and "wood".

Figure 6B:
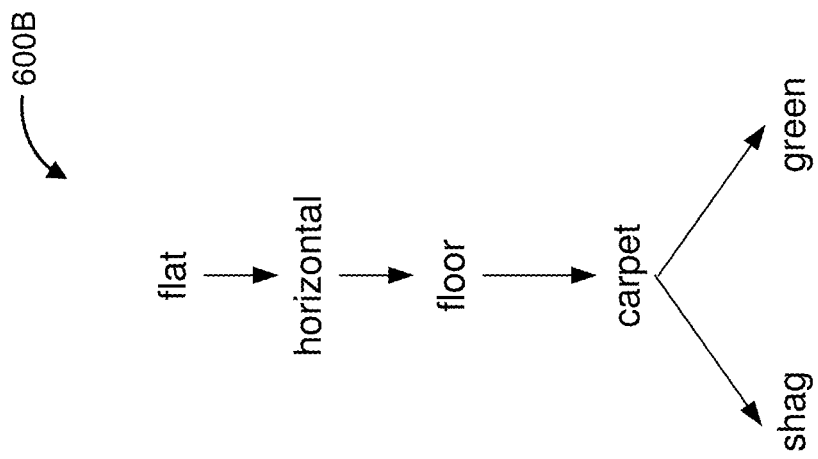
FIGS. 6A and 6B illustrates hierarchical data structures for sets of semantic labels in accordance with some implementations.
Figure 6A:
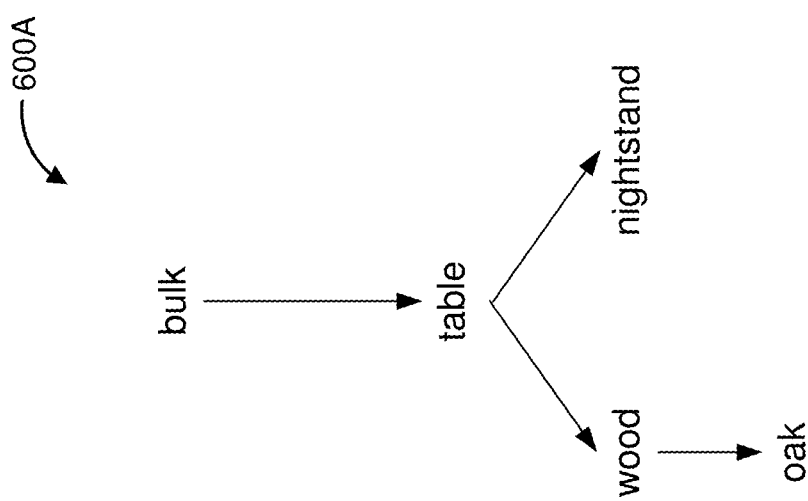

In various implementations, the semantic labels are stored as a hierarchical data object. FIG. 6A illustrates a first hierarchical data structure 600A for a set of semantic labels of a first cluster. FIG. 6B illustrates a second hierarchical data structure 600B for a set of semantic labels of a second cluster. At a shape layer, each hierarchical data structure includes a semantic label indicative of a shape of the cluster. The first hierarchical data structure 600A includes a semantic label of "bulk" at the shape layer and the second hierarchical data structure 600B includes a semantic label of "flat" at the shape layer.

At an orientation layer, the second hierarchical data structure 600B includes a semantic label of "horizontal". The first hierarchical data structure 600A does not includes an orientation layer.

At an object identity layer, each hierarchical data structure includes a semantic label indicative of an object type. The first hierarchical data structure 600A includes a semantic label of "table" at the object identity layer and the second hierarchical data structure 600B includes a semantic label of "floor" at the object identity layer.

At an object property layer, each hierarchical data structure includes a semantic label indicative of an object property of the particular object type. The first hierarchical data structure 600A includes semantic label of "wood" and a semantic label of "nightstand" at the object property layer and the second hierarchical data structure 600B includes a semantic label of "carpet" at the object property layer.

At an object property detail layer, each hierarchical data structure includes a semantic label indicative of a detail of the particular object property. The first hierarchical data structure 600A includes semantic label of "oak" at the object property detail layer beneath the semantic label of "wood" and the second hierarchical data structure 600B includes a semantic label of "shag" and a semantic label of "green" at the object property detail layer beneath the semantic label of "carpet".

As noted above, in FIG. 5, point 1 is associated with a spatial relationship vector of cluster A (SRV(A)) and a spatial relationship vector of sub-cluster A,a (SRV(A,a)). Points 2-12 are similarly associated with respective data.

Figure 7:
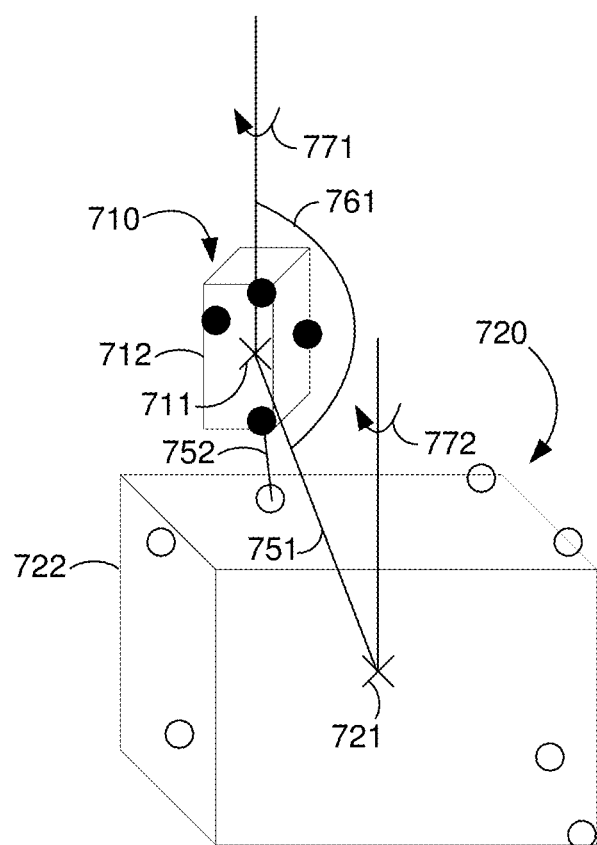
FIG. 7 illustrates spatial relationships between a first cluster of points and a second cluster of points in accordance with some implementations.

FIG. 7 illustrates spatial relationships between a first cluster of points 710 (shown in black) and a second cluster of points 720 (shown in white) in accordance with some implementations.

In various implementations, the spatial relationship vector includes a distance between the subset of the second plurality of points and the subset of the first plurality of points. In various implementations, the distance is a distance between the center of the subset of the second plurality of points and the center of the subset of the first plurality of points. For example, FIG. 7 illustrates the distance 751 between the center 711 of the first cluster of points 710 and the center 721 of the second cluster of points 720. In various implementations, the distance is a minimum distance between the closest points of the subset of the second plurality of points and the subset of the first plurality of points. For example, FIG. 7 illustrates the distance 752 between the closest points of the first cluster of point 710 and the second cluster of points 720. In various implementations, the spatial relationship vector indicates whether the subset of the second plurality of points contacts the subset of the first plurality of points.

In various implementations, the spatial relationship vector is a hierarchical data set including a hierarchy of spatial relationships. In various implementations, a first layer includes an indication of contact (or no contact), a second layer below the first layer includes an indication that a distance to another cluster is below a threshold (or above the threshold), and a third layer below the first layer indicates the distance.

In various implementations, the spatial relationship vector includes a bearing angle between the subset of the second plurality of points and the subset of the first plurality of points. In various implementations, the bearing angle is determined as the bearing from the center of the subset of the second plurality of points to the center of the subset of the first plurality of points. For example, FIG. 7 illustrates the bearing angle 761 between the center 711 of the first cluster of points 710 and the center 721 of the second cluster of points 720. Although only a single bearing angle is illustrated in FIG. 7, it is to be appreciated that in three dimensions, the bearing angle may have two components. In various implementations, the spatial relationship vector includes a bearing arc between the subset of the second plurality of points and the subset of the first plurality of points. In various implementations, the bearing arc includes the bearing angle and the number of degrees encompassed by the subset of the first plurality of points as viewed from the center of the subset of the second plurality of points.

In various implementations, a first layer includes a bearing angle, a second layer below the first layer includes a bearing arc.

In various implementations, the spatial relationship vector includes a relative orientation of the subset of the second plurality of points with respect to the subset of the first plurality of points. The relative orientation of the subset of the second plurality of points with respect to the subset of the first plurality of points indicates how much the subset of the second plurality of points is rotated with respect to the subset of the first plurality of points. For example, a cluster of points corresponding to a wall may be rotated 90 degrees with respect to a cluster of points generated by a floor (or 90 degrees about a different axis with respect to a cluster of points generated by another wall). FIG. 7 illustrates a first orientation 771 about a vertical axis of the first cluster of points 710 and a second orientation 772 about the vertical axis of the second cluster of points 720. In various implementations, the relative orientation is the difference between these two orientations. Although only a single orientation is illustrated in FIG. 7, it is to be appreciated that in three dimensions, the relative orientation may have two or three components.

In various implementations, the spatial relationship vector includes an element that is changed by a change in position or orientation of the subset of the second plurality of points with respect to the subset of the first plurality of points. For example, in various implementations, the element includes a distance, bearing, and orientation.

In various implementations, determining the spatial relationship vector includes determining a bounding box surrounding the subset of the second plurality of points and a bounding box surrounding the subset of the first plurality of points. For example, FIG. 7 illustrates a first bounding box 712 surrounding the first cluster of points 710 and a second bounding box 722 surrounding the second cluster of points 720. In various implementations, the center of the first cluster of points is determined as the center of the first bounding box and the center of the second cluster of points is determined as the center of the second bounding box. In various implementations, the distance between the first cluster of points and the second cluster of points is determined as the distance between the center of the first bounding box and the center of the second bounding box. In various implementations, the distance between the first cluster of points and the second cluster of points is determined as the minimum distance between the first bounding box and the second bounding box.

In various implementations, the orientation 771 of the first cluster of points and the orientation 772 of the second cluster of points are determined as the orientation of the first bounding box 712 and the orientation of the second bounding box 722.

In various implementations, the faces of the bounding boxes are given unique identifiers (e.g., the faces of each bounding box are labeled 1 through 6) to resolve ambiguities. The unique identifiers can be based on color of the points or the distribution of the points. Thus, if the second cluster of points rotates 90 degrees, the relative orientation is determined to have changed.

The point cloud data object 500 of FIG. 5 is one example of a three-dimensional scene model. In various implementations, the three-dimensional scene model includes negative spaces associated with semantic labels.

Figure 8B:
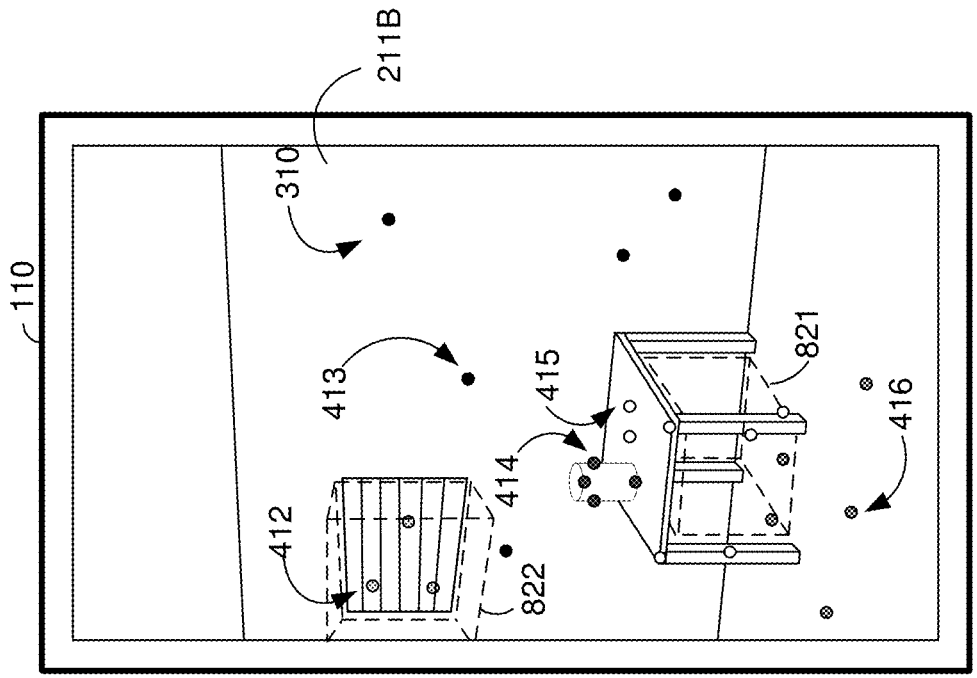
FIGS. 8A and 8B illustrate the handheld electronic device of FIG. 1 displaying the two images of the physical environment including representations of negative spaces.
Figure 8A:
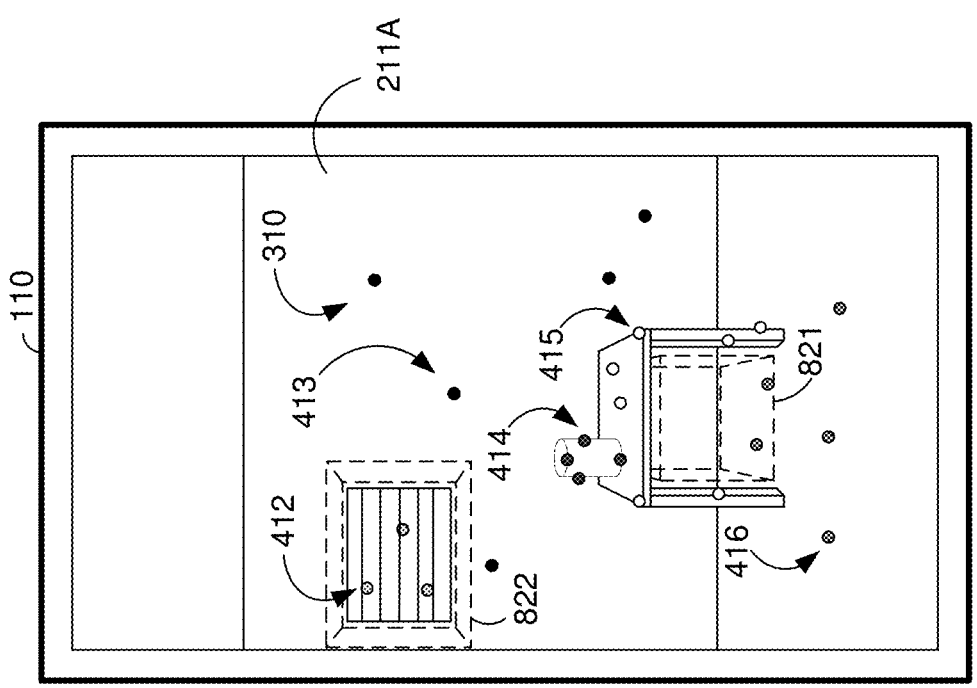

FIG. 8A illustrates the handheld electronic device 110 displaying the first image 211A overlaid with the representation of the point cloud 310 spatially disambiguated into a plurality of clusters 412-416 and representations of negative spaces 821-822. FIG. 4B illustrates the handheld electronic device 110 displaying the second image 211B overlaid with the representation of the point cloud 310 spatially disambiguated into the plurality of clusters 412-416 and the representations of negative spaces 821-822. The representation of the point cloud 310 includes a first cluster 412 (shown in light gray), a second cluster 413 (shown in black), a third cluster 414 (shown in dark gray), a fourth cluster 415 (shown in white), and a fifth cluster 416 (shown in medium gray). The representations of the negative spaces 821-822 include a representation of a first negative space 821 displayed under the representation of the table 115 and a representation of a second negative space 822 displayed in front of the representation of the vent 112.

In various implementations, the handheld electronic device 110 defines a subspace in the three-dimensional space with less than a threshold number of points. In various implementations, the threshold number of points is based on the size of the subspace. In various implementations, the threshold is 10, 5, 4, 3, or 2 points. In various implementations, the threshold is 1 point. Thus, in various implementations, the subspace includes zero points.

In various implementations, the handheld electronic device 110 determines a semantic label for the subspace. In various implementations, the semantic label is based on a size or shape of the subspace. In various implementations, the semantic label is based on a boundedness of the subspace. In various implementations, the semantic label is based on the semantic labels of nearby (or surrounding) clusters.

For example, in FIGS. 8A and 8B, the first negative space (displayed as the representation of the first negative space 821) is associated with a semantic label of "covered" and "partially surrounded" as it is covered by the top of the table 105 and partially surrounded by the table 105, the wall 103, and the floor 106. As another example, in FIG. 8A and FIG. 8B, the second negative space (displayed as the representation of the second negative space 822) is associated with a semantic label of "turbulent" as it is in front of the vent 102.

Figure 9:
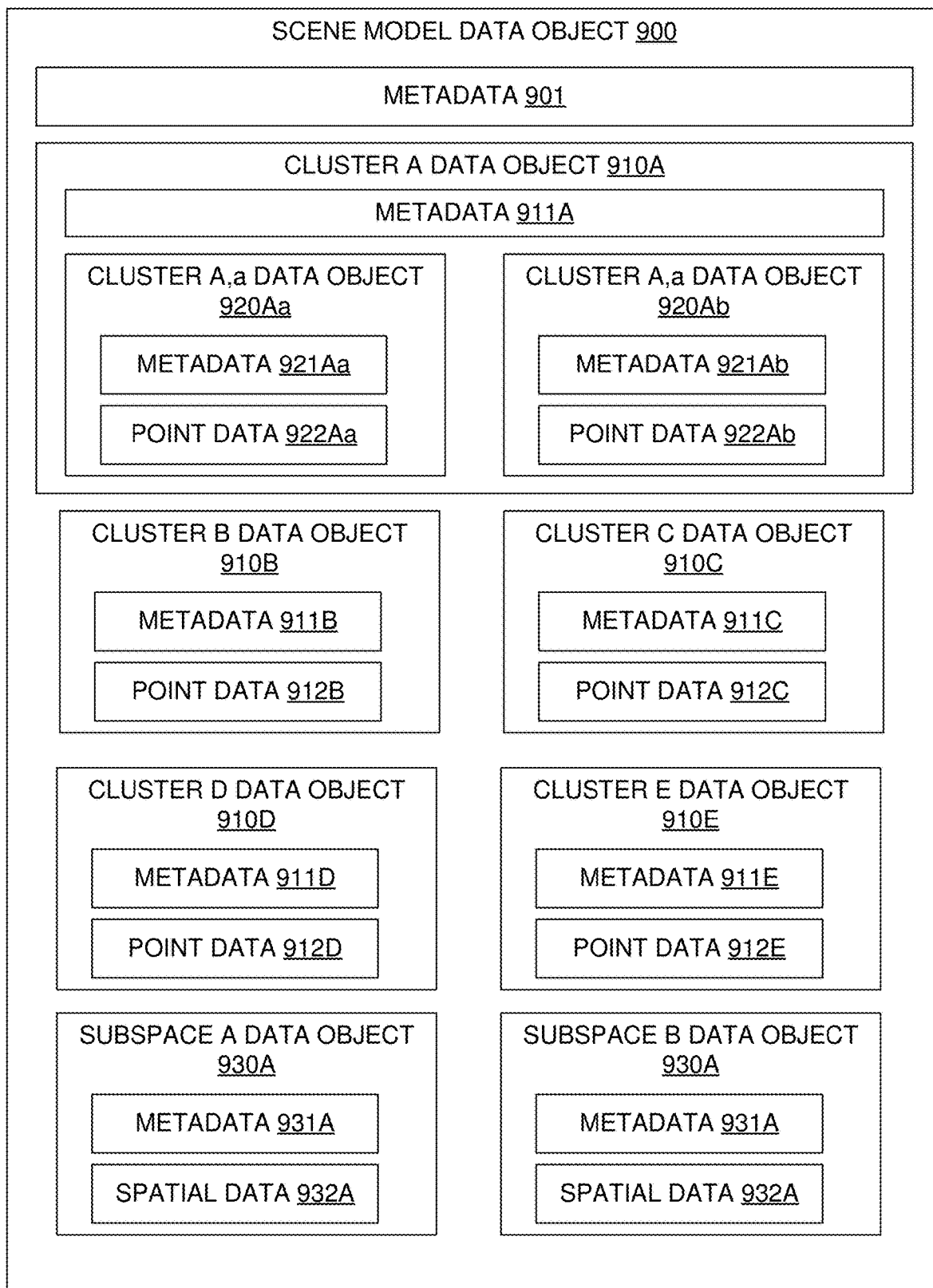
FIG. 9 illustrates a scene model data object in accordance with some implementations.

FIG. 9 illustrates a scene model data object 900 in accordance with some implementations. In various implementations, the scene model data object 900 includes scene model metadata 901, such as a title of the scene model, a time the scene model was generated, or other information regarding the scene model.

The scene model data object 900 includes a plurality of cluster data objects 910A-910E. The scene model data object 900 includes a cluster A data object 910A. The cluster A data object 910A includes cluster A metadata 911A, such as a cluster identifier of cluster A, a semantic label of cluster A, and/or a spatial relationship vector of cluster A. For example, with reference of FIG. 5, the semantic label of cluster A includes "bulk", "table", and "wood" and the spatial relationship vector of cluster A is SRV(A). The cluster A data object 910A includes two sub-cluster data objects 920Aa-920Ab. The cluster A data object 910A includes a cluster A,a data object 920Aa. The cluster A,a data object 920Aa includes cluster A,a metadata 921Aa, such as a cluster identifier of sub-cluster A,a, a semantic label of sub-cluster A,a, and/or a spatial relationship vector of sub-cluster A,a. For example, with reference to FIG. 5, the semantic label of sub-cluster A,a includes "flat", "horizontal", "tabletop", and "wood" and the spatial relationship vector of sub-cluster A,a is SRV(A,a). The cluster A,a data object 920Aa includes cluster A,a point data 922Aa indicating the sets of coordinates of points in sub-cluster A,a. In various implementations, the cluster A,a point data 922Aa includes a number of elements, each corresponding to a point in sub-cluster A,a. In various implementations, each element includes one or more of a point identifier for the point, a set of coordinates for the point, a color of the point, a color variation of the point, a confidence of the point, or other data of the point. For example, with reference to FIG. 5, the cluster A,a point data 922Aa includes the sets of coordinates (X1, Y1, Z1), (X2, Y2, Z2), and (X3, Y3, Z3).

The cluster A data object 910A includes a cluster A,b data object 920Ab. The cluster A,b data object 920Ab includes cluster A,b metadata 921Ab, such as a cluster identifier of sub-cluster A,b, a semantic label of sub-cluster A,b, and/or a spatial relationship vector of sub-cluster A,b. For example, with reference to FIG. 5, the semantic label of sub-cluster A,b includes "rod", "vertical", "leg", and "wood" and the spatial relationship vector of sub-cluster A,b is SRV(A,b). The cluster A,b data object 920Ab includes cluster A,b point data 922Ab indicating the sets of coordinates of points in sub-cluster A,b. In various implementations, the cluster A,b point data 922Ab includes a number of elements, each corresponding to a point in sub-cluster A,b. In various implementations, each element includes one or more of a point identifier for the point, a set of coordinates for the point, a color of the point, a color variation of the point, a confidence of the point, or other data of the point. For example, with reference to FIG. 5, the cluster A,b point data 922Ab includes the sets of coordinates (X6, Y6, Z6).

The scene model data object 900 includes a cluster B data object 910B. The cluster B data object 910B includes cluster B metadata 911B, such as a cluster identifier of cluster B, a semantic label of cluster B, and/or a spatial relationship vector of cluster B. For example, with reference to FIG. 5, the semantic label of cluster B includes "flat", "horizontal", "floor", and "carpet" and the spatial relationship vector of cluster B is SRV(B). The cluster B data object 910B includes cluster B point data 912B indicating the sets of coordinates of points in cluster B. In various implementations, the cluster B point data 912B includes a number of elements, each corresponding to a point in cluster B. In various implementations, each element includes one or more of a point identifier for the point, a set of coordinates for the point, a color of the point, a color variation of the point, a confidence of the point, or other data of the point. For example, with reference to FIG. 5, the cluster B point data 912B includes the sets of coordinates (X4, Y4, Z4), (X5, Y5, Z5), and (X9, Y9, Z9).

Similarly, the scene model data object 900 includes a cluster C data object 910C with cluster C metadata 911C and cluster C point data 912C, a cluster D data object 910D with cluster D metadata 911D and cluster D point data 912D, and a cluster E data object 910E with cluster E metadata 911E and cluster E point data 912E.

The scene model data object 900 includes a subspace A data object 930A. The subspace A data object 930A includes subspace A metadata 931A, such as a subspace identifier of the first negative space (referred to as "subspace A"), a semantic label of subspace A, and/or a spatial relationship vector of subspace A. For example, with reference to FIGS. 8A and 8B, the semantic label of subspace A includes "covered" and "partially surrounded". The subspace A data object 930A includes subspace A spatial data 932A indicating the spatial extent of subspace A in the three-dimensional space. For example, in various implementations, the subspace A spatial data 932A includes sets of coordinates for the vertices of a three-dimensional polyhedron bounding subspace A.

The scene model data object 900 includes a subspace B data object 930B. The subspace B data object 930B includes subspace B metadata 931B, such as a subspace identifier of the second negative space (referred to as "subspace B"), a semantic label of subspace B, and/or a spatial relationship vector of subspace B. For example, with reference to FIGS. 8A and 8B, the semantic label of subspace B includes "turbulent". The subspace B data object 930B includes subspace B spatial data 932B indicating the spatial extent of subspace B in the three-dimensional space. For example, in various implementations, the subspace B spatial data 932B includes sets of coordinates for the vertices of a three-dimensional polyhedron bounding subspace B.

In various implementations, processes executed by the handheld electronic device 110 use semantic labels in various ways. One type of process executed by the handheld electronic device 110 is an objective-effectuator. In various implementations, the handheld electronic device 110 directs an XR representation of an objective-effectuator to perform one or more actions in order to effectuate (e.g., advance, satisfy, complete and/or achieve) one or more objectives (e.g., results and/or goals). In some implementations, the objective-effectuator is associated with a particular objective, and the XR representation of the objective-effectuator performs actions that improve the likelihood of effectuating that particular objective. In some implementations, the XR representation of the objective-effectuator corresponds to an XR affordance. In some implementations, the XR representation of the objective-effectuator is referred to as an XR object.

In some implementations, an XR representation of the objective-effectuator performs a sequence of actions. In some implementations, the handheld electronic device 110 determines (e.g., generates and/or synthesizes) the actions for the objective-effectuator. In some implementations, the actions generated for the objective-effectuator are within a degree of similarity to actions that a corresponding entity (e.g., a character, an equipment and/or a thing) performs as described in fictional material or as exists in a physical environment. For example, in some implementations, an XR representation of an objective-effectuator that corresponds to a fictional action figure performs the action of flying in an XR environment because the corresponding fictional action figure flies as described in the fictional material. Similarly, in some implementations, an XR representation of an objective-effectuator that corresponds to a physical drone performs the action of hovering in an XR environment because the corresponding physical drone hovers in a physical environment. In some implementations, the handheld electronic device 110 obtains the actions for the objective-effectuator. For example, in some implementations, the handheld electronic device 110 receives the actions for the objective-effectuator from a separate device (e.g., a remote server) that determines the actions.

In some implementations, an objective-effectuator corresponding to a character is referred to as a character objective-effectuator, an objective of the character objective-effectuator is referred to as a character objective, and an XR representation of the character objective-effectuator is referred to as an XR character. In some implementations, the XR character performs actions in order to effectuate the character objective.

In some implementations, an objective-effectuator corresponding to equipment (e.g., a rope for climbing, an airplane for flying, a pair of scissors for cutting) is referred to as an equipment objective-effectuator, an objective of the equipment objective-effectuator is referred to as an equipment objective, and an XR representation of the equipment objective-effectuator is referred to as an XR equipment. In some implementations, the XR equipment performs actions in order to effectuate the equipment objective.

In some implementations, an objective-effectuator corresponding to an environment (e.g., weather pattern, features of nature and/or gravity level) is referred to as an environmental objective-effectuator, and an objective of the environmental objective-effectuator is referred to as an environmental objective. In some implementations, the environmental objective-effectuator configures an environment of the XR environment in order to effectuate the environmental objective.

Figure 10A:
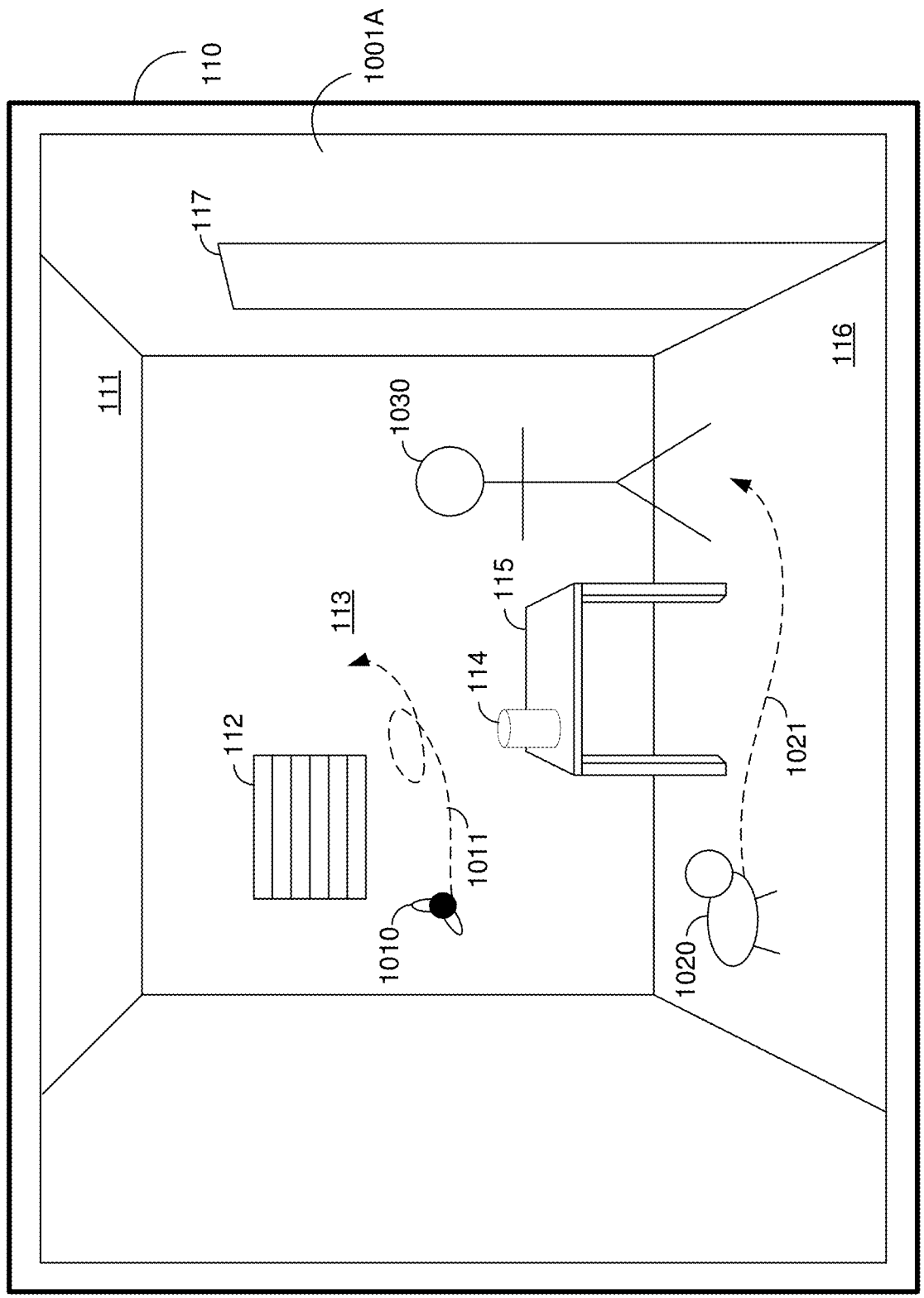
FIGS. 10A-10C illustrate the handheld electronic device of FIG. 1 displaying images of the physical environment including representations of objective-effectuators.

FIG. 10A illustrates the handheld electronic device 110 displaying a first image 1001A of the physical environment 101 during a first time period. The first image 1001A includes a representation of the physical environment 111 including a representation of the vent 112 on a representation of the wall 113, a representation of the table 115 on a representation of the floor 116, a representation of the cylinder 114 on the representation of the table 115, and a representation of the doorway 117.

The first image 1001A includes a representation of an objective-effectuator corresponding to a fly (referred to as the XR fly 1010) at a first location of the XR fly 1010 in the three-dimensional space. The first image 1001A includes a representation of an objective-effectuator corresponding to a cat (referred to as the XR cat 1020) at a first location of the XR cat 1020 in the three-dimensional space. The first image 1001A includes a representation of an objective-effectuator corresponding to a person (referred to as the XR person 1030) at a first location of the XR person 1030 in the three-dimensional space.

During the first time period, the XR fly 1010 is associated with an objective to explore the physical environment 101. The XR fly 1010 flies randomly around the physical environment, but after an amount of time, must land to rest. During the first time period, the XR cat 1020 is associated with an objective to obtain the attention of the XR person 1030. The XR cat 1020 attempts to get closer to the XR person 1030. During the first time period, the XR person 1030 is not associated with an objective.

To achieve the objective to explore the physical environment 101, the XR fly 1010 determines a path 1011 from the first location of the XR fly 1010 to a second location of the XR fly 1010 in the three-dimensional space. In various implementations, the XR fly 1010 determines the path 1011 based on a semantic label of the second negative space (e.g., the space in front of the vent 102). For example, because a real fly would have to expend extra energy to fly through a turbulent space and because the second negative space is associated with a semantic label of "turbulent", the XR fly 1010 determines the path 1011 to avoid the second negative space.

To achieve the objective to obtain the attention of the XR person 1030, the XR cat 1020 determines a path 1021 from the first location of the XR cat 1020 to a second location of the XR cat 1020 in the three-dimensional space, wherein the second location is closer to the first location of the XR person 1030. In various implementations, the XR cat 1020 determines the path 1021 based on a semantic label of the first negative space (e.g., the space under the table 105). For example, because a real cat would avoid being covered while attempting to obtain the attention of a real person and because the first negative space is associated with a semantic label of "covered", the XR cat 1020 determines the path 1021 to avoid the first negative space.

Figure 10B:
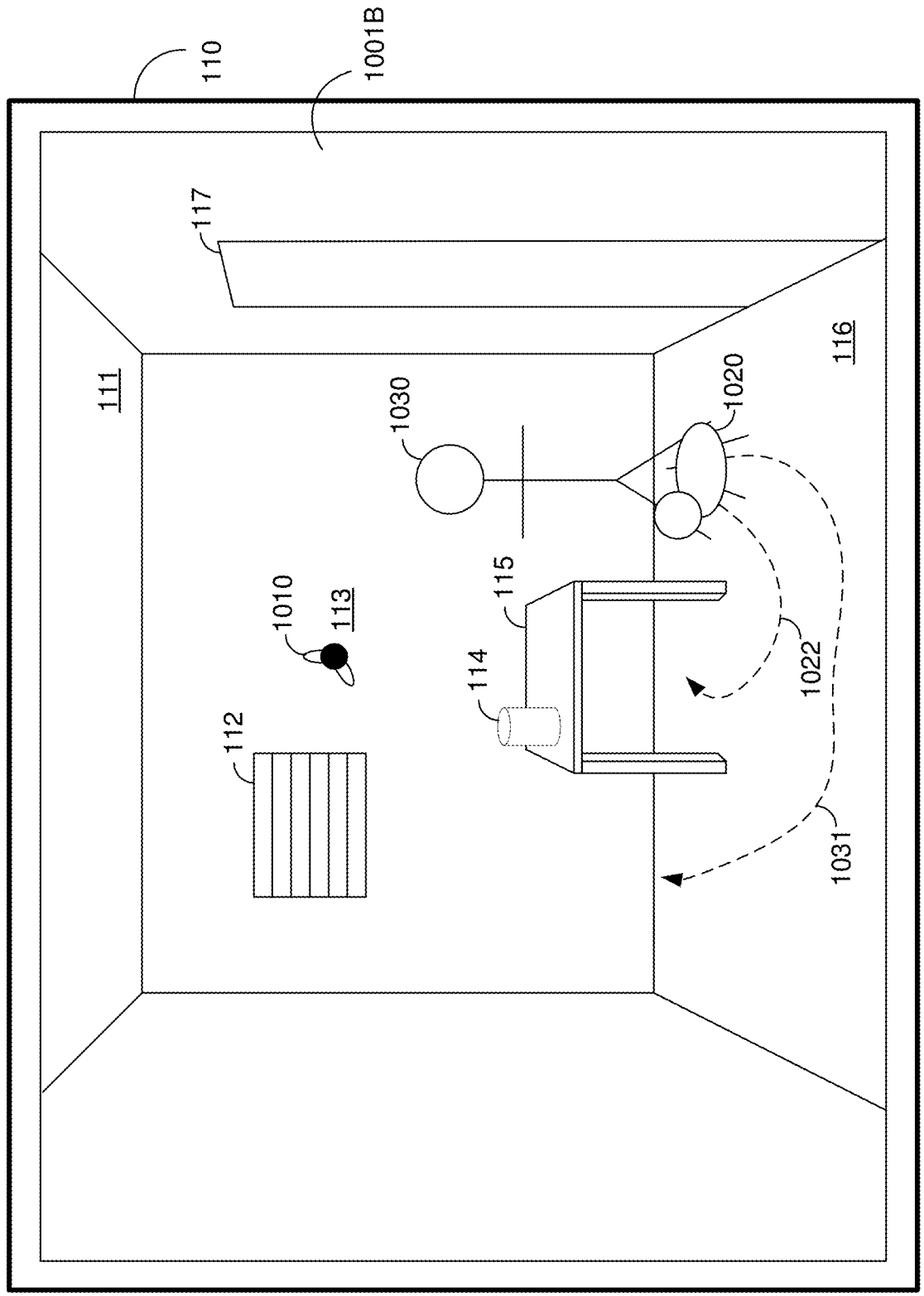

FIG. 10B illustrates the handheld electronic device 110 displaying a second image 1001B of the physical environment 101 during a second time period. To achieve the objective to explore the physical environment 101, the XR fly 1010 has flown along the path 1011 to the second location of the XR fly 1010, but must rest during the second time period. Thus, in FIG. 10B, as compared to FIG. 10A, the XR fly 1010 is displayed as landed at the second location of the XR fly 1010 on the representation of the wall 113. To achieve the objective to obtain the attention of the XR person 1030, the XR cat 1020 has walked to the second location of the XR cat 1020 closer to the XR person 1030 and obtained the attention of the XR person 1030. In various implementations, in response to obtaining the attention of the XR person 1030, the XR cat 1020 is displayed as being pet by the XR person 1030. Thus, in FIG. 10B, as compared to FIG. 10A, the XR cat 1020 is displayed at the second location of the XR cat 1020 closer to the XR person 1030.

During the second time period, the XR fly 1010 remains associated with an objective to explore the physical environment 101, but must rest during the second time period. During the second time period, having achieved the objective of obtaining the attention of the XR person 1030, the XR cat 1020 is associated with an objective to take a nap. During the second time period, the XR person 1030 is associated with an objective to cool off.

To achieve the objective to take a nap, the XR cat 1020 determines a path 10022 from the second location of the XR cat 1020 to a third location of the XR cat 1020 in the three-dimensional space. In various implementations, the XR cat 1020 determines the path 1022 based on a semantic label of the first negative space. For example, because a real cat would enjoy taking a nap in a covered and/or enclosed space and because the first negative space is associated with a semantic label of "covered" and "partially surrounded", the XR cat 1020 determines the path 1022 to include the first negative space, e.g., to end in the first negative space.

To achieve the objective to cool off, the XR person 1030 determines a path 1031 from the first location of the XR person 1030 to a second location of the XR person 1030 in the three-dimensional space. In various implementations, the XR person 1030 determines the path 1031 based on a semantic label of the second negative space. For example, because a real person could be cooled in a turbulent (or windy) space and because the second negative space is associated with a semantic label of "turbulent", the XR person 1030 determines the path 1031 to include the second negative space, e.g., to end in the second negative space.

Figure 10C:
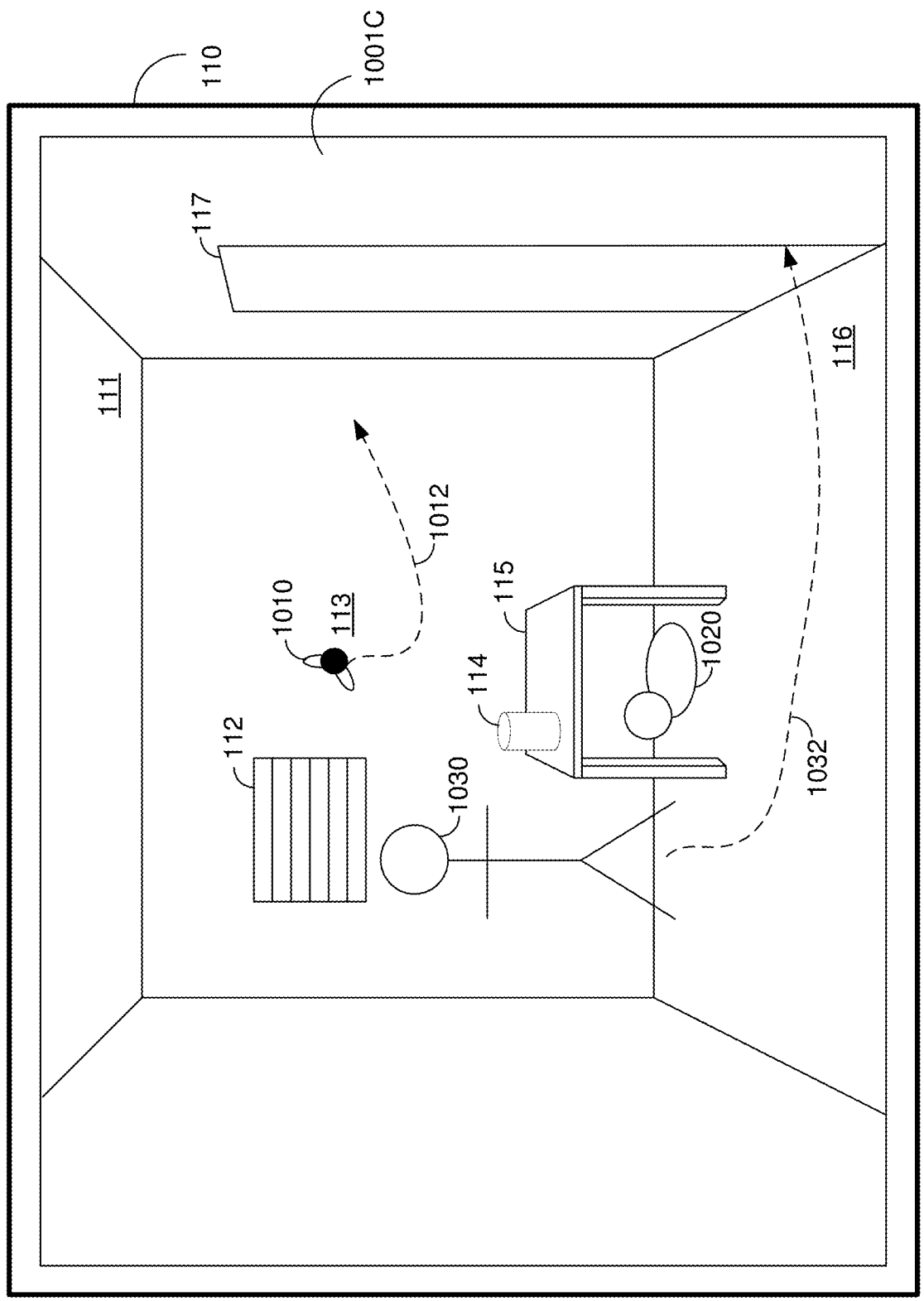

FIG. 10C illustrates the handheld electronic device 110 displaying a third image 1001C of the physical environment 101 during a third time period. To achieve the objective to take a nap, the XR cat 1020 has walked along the path 1022 to the third location of the XR cat 1020 and lied down to take a nap. Thus, in FIG. 10C, as compared to FIG. 10B, the XR cat 1020 is displayed as sleeping at the third location of the XR cat 1020 under the representation of the table 115. To achieve the objective to cool off, the XR person 1030 has walked to the second location of the XR person 1030. Thus, in FIG. 10C, as compared to FIG. 10B, the XR person 1030 is displayed at the second location of the XR person 1030.

During the third time period, the XR fly 1010 remains associated with an objective to explore the physical environment 101. During the third time period, the XR cat 1020 remains associated with the objective to take a nap. During the third time period, the XR person 1030 is associated with an objective to exit the physical environment 101.

To achieve the objective to explore the physical environment 101, the XR fly 1010 determines a path 1012 from the second location of the XR fly 1010 to a third location of the XR fly 1010 in the three-dimensional space. To achieve the objective to take a nap, the XR cat 1020 remains at the third location of the XR cat 1020. To achieve the objective to exit the physical environment 101, the XR person 1030 determines a path 1032 from the second location of the XR person 1030 to a third location of the XR person 1030 in the three-dimensional space. In various implementations, the XR person 1030 determines the path 1032 based on a semantic label of a third negative space (e.g., a space enclosed by the doorway 107). For example, because a real person would exit a physical environment through an exit, such as a doorway, and because the third negative space is associated with a semantic label of "exit" and/or "doorway", the XR person 1030 determines the path 1032 to include the third negative space, e.g., to traverse the third negative space and exit the physical environment 101.

FIG. 11 is a flowchart representation of a method 1100 of defining a negative space in a three-dimensional scene model in accordance with some implementations. In various implementations, the method 1100 is performed by a device with a processor and non-transitory memory. In some implementations, the method 1100 is performed by processing logic, including hardware, firmware, software, or a combination thereof. In some implementations, the method 1100 is performed by a processor executing instructions (e.g., code) stored in a non-transitory computer-readable medium (e.g., a memory).

The method 1100 begins, in block 1110, with the device obtaining a three-dimensional scene model of a physical environment including a plurality of points, wherein each of the plurality of points is associated with a set of coordinates in a three-dimensional space.

In various implementations, the three-dimensional scene model includes the plurality of points as vertices of one or more mesh-based object models, wherein the one or more mesh-based object models include one or more edges between the vertices. In various implementations, the mesh-based object models further include one or more faces surrounded by edges, one or more textures associated with the faces, and/or a semantic label, object/cluster identifier, physics data or other information associated with the mesh-based object model.

The plurality of points, alone or as the vertices of mesh-based object models, is a point cloud. Accordingly, in various implementations, obtaining the three-dimensional scene model includes obtaining a point cloud.

In various implementations, obtaining the point cloud includes obtaining a plurality of images of the physical environment from a plurality of different perspectives and generating the point cloud based on the plurality of images of the physical environment. For example, in various implementations, the device detects the same feature in two or more images of the physical environment and using perspective transform geometry, determines the sets of coordinates in the three-dimensional space of the feature. In various implementations, the plurality of images of the physical environment is captured by the same camera at different times during the first time period (e.g., by the same single scene camera of the device at different times when the device is moved between the times). In various implementations, the plurality of images is captured by different cameras at the same time (e.g., by multiple scene cameras of the device).

In various implementations, obtaining the point cloud includes obtaining an image of a physical environment, obtaining a depth map of the image of the physical environment, and generating the point cloud based on the image of the physical environment and the depth map of the image of the physical environment. In various implementations, the image is captured by a scene camera of the device and the depth map of the image of the physical environment is generated by a depth sensor of the device.

In various implementations, obtaining the point cloud includes using a 3D scanner to generate the point cloud.

In various implementations, each point in the point cloud is associated with additional data. In various implementations, each point in the point cloud is associated with a color. In various implementations, each point in the point cloud is associated with a color-variation indicating how the point changes color over time. As an example, such information may be useful in discriminating between a semantic label of a "picture" or a "television". In various implementations, each point in the point cloud is associated with a confidence indicating a probability that the set of coordinates in the three-dimensional space of the point is the true location of the corresponding surface of the object in the physical environment.

In various implementations, obtaining the point cloud includes spatially disambiguating portions of the plurality of points into a plurality of clusters. Each cluster includes a subset of the plurality of points of the point cloud and is assigned a unique cluster identifier. In various implementations, particular points of the plurality of points (e.g., those designated as noise) are not included in any of the plurality of clusters.

Various point cloud clustering algorithms can be used to spatially disambiguate the point cloud. In various implementations, spatially disambiguating portions of the plurality of points into the plurality of clusters includes performing plane model segmentation. Accordingly, certain clusters of the plurality of clusters correspond to sets of points of the point cloud that lie in the same plane. In various implementations, spatially disambiguating portions of the plurality of points into the plurality of clusters includes performing Euclidean cluster extraction.

In various implementations, obtaining the first three-dimensional scene model includes obtaining a hierarchical data set. In various implementations, the hierarchical data set includes a hierarchy of semantic labels. Accordingly, in various implementations, obtaining the first three-dimensional scene model includes determining one or more semantic labels for a subset of the plurality of points.

In various implementations, the device determines a semantic label by comparing dimensions of the subset of the plurality of points. For example, in various implementations, each cluster is associated with a semantic label of "flat" indicating that the cluster (or a bounding box surrounding the cluster) has one dimension substantially smaller than the other two, "rod" indicating that the cluster (or a bounding box surrounding the cluster) has one dimension substantially larger than the other two, or "bulk" indicating that no dimension of the cluster (or a bounding box surrounding the cluster) is substantially larger than the others.

In various implementations, the device determines a semantic label with a neural network. In particular, the device applies a neural network to the sets of coordinates in the three-dimensional space of the points of the subset of the plurality of points to generate a semantic label.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sets of coordinates in the three-dimensional space of the points of the subset of the first plurality of points. In various implementations, the neural network provides, as an output, a semantic label for the subset.

As noted above, in various implementations, each point is associated with additional data. In various implementations, the additional data is also provided as an input to the neural network. For example, in various implementations, the color or color variation of each point of the subset is provided to the neural network. In various implementations, the confidence of each point of the cluster is provided to the neural network.

In various implementations, the neural network is trained for a variety of object types. For each object type, training data in the form of point clouds of objects of the object type is provided. More particularly, training data in the form of the sets of coordinates in the three-dimensional space of the points of point cloud are provided. Thus, the neural network is trained with many different point clouds of different tables to train the neural network to classify clusters as a "table". Similarly, the neural network is trained with many different point clouds of different chairs to train the neural network to classify clusters as a "chair".

In various implementations, the neural network includes a plurality of neural network detectors, each trained for a different object type. Each neural network detector, trained on point clouds of objects of the particular object type, provides, as an output, a probability that a particular subset corresponds to the particular object type in response to receiving the sets of coordinates in the three-dimensional space of the points of the particular subset. Thus, in response to receiving the sets of coordinates in the three-dimensional space of the points of a particular subset, a neural network detector for tables may output a 0.9, a neural network detector for chairs may output a 0.5, and a neural network detector for cylinders may output a 0.2. The semantic label is determined based on the greatest output.

In various implementations, the hierarchical data set includes a hierarchy of spatial relationships. Accordingly, in various implementations, obtaining the first three-dimensional scene model includes determining one or more spatial relationships for a subset of the plurality of points.

The method 1100 continues, in block 1120, with the device defining a subspace in the three-dimensional space with less than a threshold number of the plurality of points. In various implementations, the threshold number is based on the size of the subspace. For example, in various implementations, the threshold number is a point density within the subspace. In various implementations, the threshold number is 10, 5, 4, 3, or 2 points. In various implementations, the threshold number is 1 point. Thus, in various implementations, the subspace includes zero points. In various implementations, the device defines a subspace in the three-dimensional space without any of the plurality of points.

In various implementations, defining the subspace includes detecting a first subspace in the three-dimensional space with less than the threshold number of the plurality of points and spatially disambiguating the first subspace into a plurality of second subspaces in the three-dimensional space, wherein each of the plurality of second subspaces includes less than the threshold number of the plurality of points. In various implementations, the defined subspace is one of the second subspaces.

Thus, in various implementations, a negative space in the physical environment is partitioned into a plurality of negative spaces. In various implementations, the partitioning is based on the presence of points between the partitions. In various implementations, the partitions between the second subspaces are planes.

In various implementations, defining the subspace includes detecting a first subspace in the three-dimensional space, defined by a first set of dimensional parameters, with less than the threshold number of points. For example, in various implementations, the first subspace is a prism with a length of A units, a height of B units, and a width of C units. As another example, in various implementations, the first subspace is an ellipsoid with principle axes of lengths A units, B units, and C units. In various implementations, defining the subspace includes generating a second set of dimensional parameters by increasing at least one of the first set of dimensional parameters. In various implementations, defining the subspace includes defining a second subspace in the three-dimensional space, defined by a second set of dimensional parameters. In various implementations, the second subspace is translated (e.g., shifted) or rotated with respect to the first subspace.

For example, in various implementations, the second subspace is a prism with a length of A+a units, a height of B units, and width of C units. As another example, in various implementations, the second subspace is an ellipsoid with principle axes of lengths A+a units, B+b units, and C+c units. In various implementations, the first subspace is centered at a first location in the three-dimensional space and the second subspace is centered at a second location (within the first subspace) in the three-dimensional space. In various implementations, the second subspace is rotated with respect to the first subspace.

In various implementations, defining the subspace includes determining that the second subspace includes less than the threshold number of points. In various implementations, increasing the dimensional parameters is performed iteratively until the second subspace does not include less than the threshold number of the plurality of points. In various implementations, if the second subspace includes the threshold number of the plurality of points (or more), the second subspace is translated or rotated to determine if the transformed second subspace includes less than the threshold number of points. Thus, with respect to FIGS. 8A and 8B, a subspace is defined as a small cube under the table 105. The subspace grows (and, potentially, shifts or turns), while retaining a prismatic shape, up until the subspace would encompass the threshold number (or more) of the plurality of points. At that point, the subspace is the defined subspace, e.g., the first negative space represented by the representation of the first negative space 821.

The method 1100 continues, in block 1120, with the device determining a semantic label for the subspace. In various implementations, the device determines multiple semantic labels for the subspace, such as a hierarchical data set or semantic labels for respective portions of the subspace.

In various implementations, determining the semantic label is based on a size and/or shape of the subspace. For example, in various implementations, the semantic label indicates that the subspace is large enough for an XR fly to occupy, an XR cat to occupy, or an XR person to occupy. For example, in various implementations, the semantic label indicates that the subspace is pyramidally shaped. Thus, an XR character based on a fictional character that believes power can be derived from such shaped subspaces may attempt to achieve an objective of occupying such a subspace. As another example, in various implementations, the semantic label indicates that the subspace is tunnel shaped. Thus, an XR dog based on dog agility trained to traverse tunnels may attempt to achieve an objective to traverse such a subspace.

In various implementations, determining the semantic label is based on boundedness of the subspace. For example, in various implementations, the semantic label indicates that the subspace is covered. Thus, as in FIG. 10B, an XR cat may attempt to achieve an objective to nap in such a subspace. As another example, in various implementations, the semantic label indicates an amount that the subspace is enclosed by points of the plurality of points. For example, as in FIGS. 8A and 8B, in various implementations, the first negative space represented by the representation of the first negative space 821 is associated with a semantic label indicating that it is enclosed on three sides (by the tabletop, the wall, and the floor). As another example, in various implementations, the first negative space is associated with a semantic label indicating that it is between 55 and 60 percent enclosed (e.g., on three of six sides by the tabletop, the wall, and the floor, and additionally by the legs of the tab). Thus, an XR cat may attempt to occupy a subspace within a cardboard box associated with a semantic label indicating that it is enclosed on five sides. As another example, an XR person may avoid occupying an enclosed subspace, such as a corner or a small closet.

In various implementations, a subset of the plurality of points is associated with a cluster semantic label and determining the semantic label is based on the cluster semantic label. In various implementations, the plurality of points is adjacent to the subspace. In various implementations, the subset of the plurality of points at least partially surrounds the subspace. For example, various implementations, the semantic label indicates that the subspace is turbulent (e.g., based on being adjacent to a cluster with a cluster semantic label of a "fan" or a "vent"). Thus, as in FIG. 10A, an XR fly may attempt to achieve an objective, but avoid such a subspace. Further, as in FIG. 10B, an XR person may attempt to achieve an objective by occupying such a subspace. As another example, in various implementations, the semantic label indicates that the subspace is food-appropriate (e.g., based on being at least partially surrounded by a cluster with cluster semantic label of "dish" or "bowl"). Thus, an XR person may attempt to achieve an objective by placing XR food within the subspace.

In various implementations, defining the subspace (in block 1120) is based on the semantic label (determined in block 1130). For example, with respect to FIGS. 8A and 8B, the shape of the second negative space (e.g., generally flaring outward from the vent 102) represented by the representation of the second negative space 842 is based on the semantic label of "turbulent" which is based on the second negative space being adjacent to a cluster with a cluster semantic label of "vent".

Thus, in various implementations, defining the subspace includes detecting a first subspace in the three-dimensional space with less than the threshold number of the plurality of points and defining, based on the semantic label, a second subspace in the three-dimensional space with less than the threshold number of the plurality of points. In various implementations, the defined subspace is the second subspace.

The method 1100 continues, in block 1140, with the device generating a characterization vector of the subspace, wherein the characterization vector includes the spatial extent of the subspace and the semantic label. For example, in FIG. 9, the subspace A data object 930A is a characterization vector of subspace A and the subspace B data object 930B is a characterization vector of subspace B. In various implementations, the characterization vector includes the spatial extent of the subspace as sets of coordinates for the vertices of a three-dimensional polyhedron bounding the subspace.

In various implementations, the characterization vector further includes a subspace identifier of the subspace and/or a spatial relationship vector of the subspace indicating spatial relationships of the subspace with respect to one or more other subspaces and/or one or more other clusters.

Figure 12:
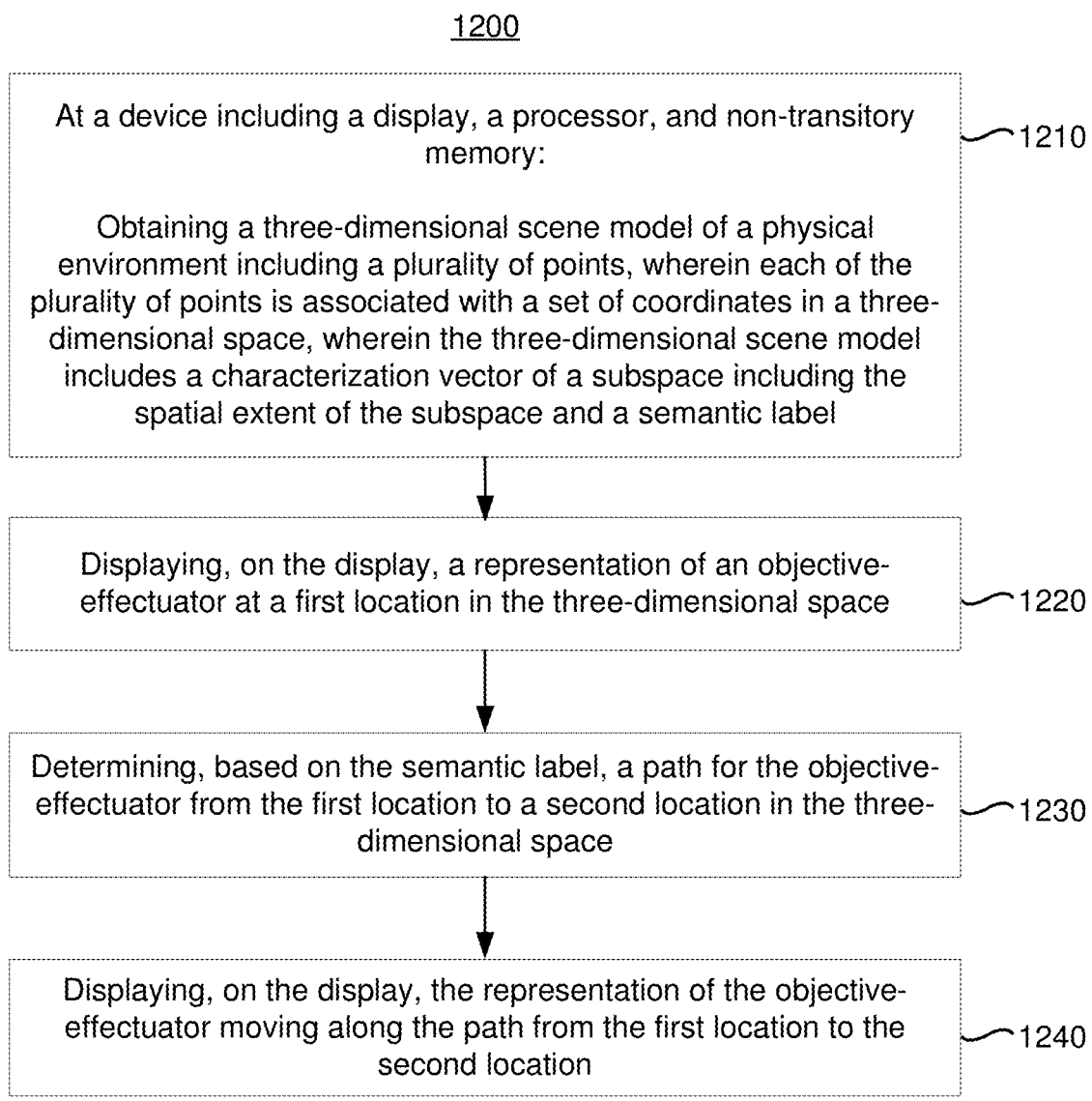
FIG. 12 is a flowchart representation of a method of displaying a representation of an objective-effectuator in accordance with some implementations.

FIG. 12 is a flowchart representation of a method 1200 of displaying a representation of an objective-effectuator in accordance with some implementations. In various implementations, the method 1200 is performed by a device with a display, a processor, and non-transitory memory. In some implementations, the method 1200 is performed by processing logic, including hardware, firmware, software, or a combination thereof. In some implementations, the method 1200 is performed by a processor executing instructions (e.g., code) stored in a non-transitory computer-readable medium (e.g., a memory).

The method 1200 begins, in block 1210, with the device obtaining a three-dimensional scene model of a physical environment including a plurality of points, wherein each of the plurality of points is associated with a set of coordinates in a three-dimensional space, wherein the three-dimensional scene model includes a characterization vector of a subspace including the spatial extent of the subspace of a semantic label.

In various implementations, the three-dimensional scene model is obtained as described above with respect to the method 1100 of FIG. 11.

The method 1200 continues, in block 1220, with the device displaying, on the display, a representation of an objective-effectuator at a first location in the three-dimensional space. For example, in FIG. 10A, the handheld electronic device 110 displays the XR fly 1010 at the first location of the XR fly 1010, the XR cat 1020 at the first location of the XR cat 1020, and the XR person 1030 at the first location of the XR person 1030.

The method 1200 continues, in block 1230, with the device determining, based on the semantic label, a path for the objective-effectuator from the first location to a second location in the three-dimensional space. In various implementations, the device executes, using the processor, the objective-effectuator and the objective-effectuator determines the path. In various implementations, another device (either within the physical environment or remote to the physical environment) executes the objective-effectuator and transmits the request to the device. Thus, in various implementations, the device includes a communications interface and determining the path includes receiving the path via the communications interface.

In various implementations, the path avoids the subspace. For example, in FIG. 10A, the XR fly 1010 determines the path 1011 from the first location of the XR fly 1010 to the second location of the XR fly 1010 in order to avoid the second negative space.

In various implementations, the path includes at least a portion of the subspace. For example, in various implementations, the second location is within the subspace. For example, in FIG. 10B, the XR cat 1020 determines the path 1022 from the second location of the XR cat 1020 to the third location of the XR cat 1020 (which is within the first negative space).

In various implementations, the path is determined based on an objective of the objective-effectuator. For example, in various implementations, the second location is selected based on the objective of the objective-effectuator. For example, in FIG. 10B, the XR cat 1020 determines the path 1022 to location within the first negative space based on an objective of taking a nap (and a deduction that a "covered" negative space is an appropriate place to do so).

In various implementations, determining the path includes determining, based on the semantic label, a first path for the objective-effectuator that avoids the subspace based on a first objective of the objective-effectuator and determining, based on the semantic label, a second path for the objective-effectuator that includes at least a portion of the subspace based on a second objective of the objective-effectuator. For example, in FIG. 10A, the XR cat 1020 determines a first path (e.g., the path 1021) that avoids the first negative space based on the semantic label of "covered" and an objective to obtain the attention of the XR person 1030 and, in FIG. 10B, the XR cat 1020 determines a second path (e.g., the path 1022) that ends in the first negative space based on the semantic label of "covered" and an objective to take a nap.

In various implementations, determining the path includes determining, based on the semantic label, a first path for a first objective-effectuator that avoids the subspace based on an objective of the first objective-effectuator and determining, based on the semantic label, a second path for a second objective-effectuator that includes at least a portion of the subspace based on an objective of the second objective-effectuator. For example, in FIG. 10A, the XR fly 1010 determines a first path (e.g., the path 1011) that avoids the second negative space based on the semantic label of "turbulent" and an objective to explore the physical environment and, in FIG. 10B, the XR person 1030 determines a second path (e.g., the path 1031) that ends in the second negative space based on the semantic label of "turbulent" and an object to cool off.

In various implementations, the semantic label indicates a boundedness of the subspace. For example, in various implementations, the semantic label indicates that the subspace is covered. Thus, as in FIG. 10B, an XR cat may attempt to achieve an objective to nap in such a subspace. As another example, in various implementations, the semantic label indicates an amount that the subspace is enclosed by points of the plurality of points. Thus, an XR cat may attempt to occupy a subspace within a cardboard box. As another example, an XR person may avoid occupying an enclosed subspace, such as a corner or a small closet.

In various implementations, the semantic label indicates an atmospheric characteristic of the subspace, such as a wind condition, a temperature, a pressure, or a humidity. For example, in various implementations, the semantic label indicates that the subspace is turbulent (e.g., based on being adjacent to a cluster with a cluster semantic label of a "fan" or a "vent"). Thus, as in FIG. 10A, an XR fly may attempt to achieve an objective, but avoid such a subspace. Further, as in FIG. 10B, an XR person may attempt to achieve an objective by occupying such a subspace. As another example, the semantic label indicates that the subspace is warm (e.g., based on being adjacent to a cluster with a cluster semantic label of "fireplace" or "heater") or cool (e.g., based on being adjacent to a cluster with a cluster semantic label of "refrigerator" or "air conditioner").

In various implementations, the semantic label indicates an exit of the physical environment. For example, in various implementations, the semantic label indicates that the subspace is a doorway. Thus, as in FIG. 10C, an XR person may attempt to achieve an objective to exit the physical environment by traversing the third negative space (e.g., the space enclosed by the doorway 107).

In various implementations, the semantic label indicates a social acceptability of occupying the subspace. For example, in various implementations, the semantic label indicates that the subspace is between a wall and the back of a couch approximately two feet from the wall. Although a person could occupy such a subspace, in various implementations, a person may feel uncomfortable standing in or walking through such a subspace. Thus, to achieve an objective (e.g., to exit the physical environment), a person may walk around the couch rather than behind it through the subspace. As another example, in various implementations, the semantic label indicates that the subspace is a closet. Although a person could occupy such a subspace, in various implementations, a person may feel uncomfortable standing in such a subspace without a particular reason to do so. Accordingly, in various implementations, an XR person attempting to achieve an objective avoids a subspace with a semantic label indicating a social unacceptability of occupying the subspace.

The method 1200 continues, in block 1240, with the device displaying, on the display, the representation of the objective-effectuator moving along the path from the first location to the second location.

Figure 13:
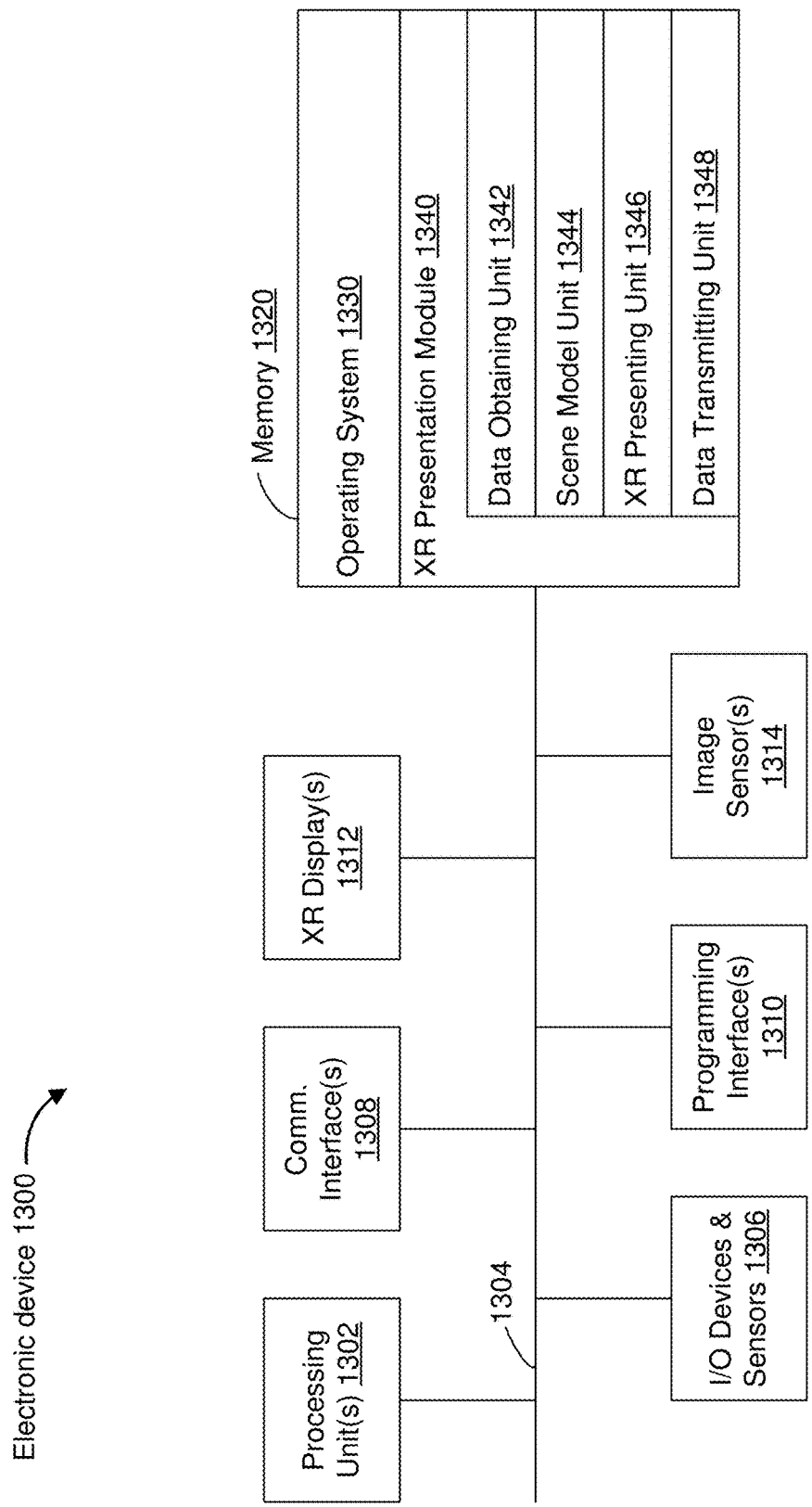
FIG. 13 is a block diagram of an electronic device in accordance with some implementations.

FIG. 13 is a block diagram of an electronic device 1300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1300 includes one or more processing units 1302 (e.g., microprocessors, ASICs, FPGAs, GPUs, CPUs, processing cores, and/or the like), one or more input/output (I/O) devices and sensors 1306, one or more communication interfaces 1308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1310, one or more XR displays 1312, one or more optional interior- and/or exterior-facing image sensors 1314, a memory 1320, and one or more communication buses 1304 for interconnecting these and various other components.

In some implementations, the one or more communication buses 1304 include circuitry that interconnects and controls communications between system components. In some implementations, the one or more I/O devices and sensors 1306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1312 are configured to present XR content to the user. In some implementations, the one or more XR displays 1312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1312 correspond to diffractive, reflective, polarized, holographic, etc. waveguide displays. For example, the electronic device 1300 includes a single XR display. In another example, the electronic device 1300 includes an XR display for each eye of the user. In some implementations, the one or more XR displays 1312 are capable of presenting AR, MR, and/or VR content.

In various implementations, the one or more XR displays 1312 are video passthrough displays which display at least a portion of a physical environment as an image captured by a scene camera. In various implementations, the one or more XR displays 1312 are optical see-through displays which are at least partially transparent and pass light emitted by or reflected off the physical environment.

In some implementations, the one or more image sensors 1314 are configured to obtain image data that corresponds to at least a portion of the face of the user that includes the eyes of the user (any may be referred to as an eye-tracking camera). In some implementations, the one or more image sensors 1314 are configured to be forward-facing so as to obtain image data that corresponds to the physical environment as would be viewed by the user if the electronic device 1300 was not present (and may be referred to as a scene camera). The one or more optional image sensors 1314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1320 includes high-speed random-access memory, such as DRAM, SRAM, DDR RAM, or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 comprises a non-transitory computer readable storage medium. In some implementations, the memory 1320 or the non-transitory computer readable storage medium of the memory 1320 stores the following programs, modules and data structures, or a subset thereof including an optional operating system 1330 and an XR presentation module 1340.

The operating system 1330 includes procedures for handling various basic system services and for performing hardware dependent tasks. In some implementations, the XR presentation module 1340 is configured to present XR content to the user via the one or more XR displays 1312. To that end, in various implementations, the XR presentation module 1340 includes a data obtaining unit 1342, a negative space unit 1344, an XR presenting unit 1346, and a data transmitting unit 1348.

In some implementations, the data obtaining unit 1342 is configured to obtain data (e.g., presentation data, interaction data, sensor data, location data, etc.). The data may be obtained from the one or more processing units 1302 or another electronic device. For example, in various implementations, the data obtaining unit 1342 obtains (and stores in the memory 1320) a three-dimensional scene model of a physical environment (including, in various implementations, a point cloud). To that end, in various implementations, the data obtaining unit 1342 includes instructions and/or logic therefor, and heuristics and metadata therefor.

In some implementations, the negative space unit 1344 is configured to define a negative space and apply a semantic label and/or determine a path for an objective-effectuator based on a semantic label of a negative space. To that end, in various implementations, the negative space unit 1344 includes instructions and/or logic therefor, and heuristics and metadata therefor.

In some implementations, the XR presenting unit 1346 is configured to present XR content via the one or more XR displays 1312. To that end, in various implementations, the XR presenting unit 1346 includes instructions and/or logic therefor, and heuristics and metadata therefor.

In some implementations, the data transmitting unit 1348 is configured to transmit data (e.g., presentation data, location data, etc.) to the one or more processing units 1302, the memory 1320, or another electronic device. To that end, in various implementations, the data transmitting unit 1348 includes instructions and/or logic therefor, and heuristics and metadata therefor.

Although the data obtaining unit 1342, the negative space unit 1344, the XR presenting unit 1346, and the data transmitting unit 1348 are shown as residing on a single electronic device 1300, it should be understood that in other implementations, any combination of the data obtaining unit 1342, the negative space unit 1344, the XR presenting unit 1346, and the data transmitting unit 1348 may be located in separate computing devices.

Moreover, FIG. 13 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 13 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, a processor, and non-transitory memory:
obtaining a three-dimensional scene model of a scene including a plurality of points, wherein each of the plurality of points is associated with a set of coordinates in a three-dimensional space, wherein the three-dimensional scene model includes a subspace enclosing less than a threshold number of the plurality of points and associated with a semantic label;
displaying, on the display, a representation of an objective-effectuator at a first location in the three-dimensional space;
determining, based on the semantic label, a path for the objective-effectuator from the first location to a second location in the three-dimensional space; and
displaying, on the display, the representation of the objective-effectuator moving along the path from the first location to the second location.

2. The method of claim 1, wherein the path avoids the subspace.

3. The method of claim 1, wherein the path includes at least a portion of the subspace.

4. The method of claim 3, wherein the second location is within the subspace.

5. The method of claim 1, wherein the path is determined based on an objective of the objective-effectuator.

6. The method of claim 5, wherein the second location is selected based on the objective of the objective-effectuator.

7. The method of claim 1, wherein determining the path includes:
determining, based on the semantic label, a first path for the objective-effectuator that avoids the subspace based on a first objective of the objective-effectuator; and
determining, based on the semantic label, a second path for the objective-effectuator that includes at least a portion of the subspace based on a second objective of the objective-effectuator.

8. The method of claim 1, wherein determining the path includes:
determining, based on the semantic label, a first path for a first objective-effectuator that avoids the subspace based on an objective of the first objective-effectuator; and
determining, based on the semantic label, a second path for a second objective-effectuator that includes at least a portion of the subspace based on an objective of the second objective-effectuator.

9. The method of claim 1, wherein the semantic label indicates a boundedness of the subspace.

10. The method of claim 1, wherein the semantic label indicates an atmospheric characteristic of the subspace.

11. The method of claim 1, wherein the semantic label indicates an exit of the scene.

12. The method of claim 1, wherein the semantic label indicates a social acceptability of occupying the subspace.

13. The method of claim 1, wherein the subspace encloses none of the plurality of points.

14. The method of claim 1, wherein the three-dimensional scene model includes a characterization vector of the subspace including a spatial extent of the subspace and the semantic label.

15. The method of claim 1, wherein the objective-effectuator is a virtual character.

16. A device comprising:
a display;
a non-transitory memory; and
one or more processors to:
obtain a three-dimensional scene model of a scene including a plurality of points, wherein each of the plurality of points is associated with a set of coordinates in a three-dimensional space, wherein the three-dimensional scene model includes a subspace enclosing less than a threshold number of the plurality of points and associated with a semantic label;
display, on the display, a representation of an objective-effectuator at a first location in the three-dimensional space;
determine, based on the semantic label, a path for the objective-effectuator from the first location to a second location in the three-dimensional space; and
display, on the display, the representation of the objective-effectuator moving along the path from the first location to the second location.

17. The device of claim 16, wherein the path avoids the subspace.

18. The device of claim 16, wherein the path includes at least a portion of the subspace.

19. The device of claim 16, wherein the one or more processors are to determine the path by:
determining, based on the semantic label, a first path for the objective-effectuator that avoids the subspace based on a first objective of the objective-effectuator; and
determining, based on the semantic label, a second path for the objective-effectuator that includes at least a portion of the subspace based on a second objective of the objective-effectuator.

20. The device of claim 16, wherein the one or more processors are to determine the path by:
determining, based on the semantic label, a first path for a first objective-effectuator that avoids the subspace based on an objective of the first objective-effectuator; and
determining, based on the semantic label, a second path for a second objective-effectuator that includes at least a portion of the subspace based on an objective of the second objective-effectuator.

21. A non-transitory memory storing one or more programs, which, when executed by one or more processors of a device including a display, cause the device to:
obtain a three-dimensional scene model of a scene including a plurality of points, wherein each of the plurality of points is associated with a set of coordinates in a three-dimensional space, wherein the three-dimensional scene model includes a subspace enclosing less than a threshold number of the plurality of points and associated with a semantic label;
display, on the display, a representation of an objective-effectuator at a first location in the three-dimensional space;
determine, based on the semantic label, a path for the objective-effectuator from the first location to a second location in the three-dimensional space; and
display, on the display, the representation of the objective-effectuator moving along the path from the first location to the second location.

* * * * *